(12) United States Patent
Ueda

(10) Patent No.: US 11,935,275 B2
(45) Date of Patent: Mar. 19, 2024

(54) IMAGE PROCESSING METHOD, IMAGE PROCESSING DEVICE, AND RECORDING MEDIUM

(71) Applicant: PANASONIC INTELLECTUAL PROPERTY MANAGEMENT CO., LTD., Osaka (JP)

(72) Inventor: Isao Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 500 days.

(21) Appl. No.: 17/420,857

(22) PCT Filed: Jan. 16, 2020

(86) PCT No.: PCT/JP2020/001357
§ 371 (c)(1),
(2) Date: Jul. 6, 2021

(87) PCT Pub. No.: WO2020/240912
PCT Pub. Date: Dec. 3, 2020

(65) Prior Publication Data
US 2022/0101622 A1 Mar. 31, 2022

(30) Foreign Application Priority Data
May 30, 2019 (JP) .................... 2019-101127

(51) Int. Cl.
*G06V 10/56* (2022.01)
*G06T 7/90* (2017.01)
(Continued)

(52) U.S. Cl.
CPC ............. *G06V 10/56* (2022.01); *G06T 7/90* (2017.01); *G06V 10/50* (2022.01); *G06V 40/10* (2022.01)

(58) Field of Classification Search
None
See application file for complete search history.

(56) References Cited

U.S. PATENT DOCUMENTS 5,497,431 A * 3/1996 Nakamura ............... H04N 1/62
382/162
5,557,688 A * 9/1996 Nakamura ............. H04N 1/628
382/164

(Continued)

FOREIGN PATENT DOCUMENTS

| JP | H09-171220 A | 6/1997 |
| JP | 2002-203239 A | 7/2002 |
| JP | 2005-295490 A | 10/2005 |

OTHER PUBLICATIONS

Extended European Search Report dated Feb. 14, 2022 issued in corresponding European Patent Application No. 20815486.4.
(Continued)

*Primary Examiner* — Dov Popovici
(74) *Attorney, Agent, or Firm* — Rimon P.C.

(57) ABSTRACT

An image processing method includes: extracting, based on pixel values of a plurality of pixels of an image obtained, a plurality of first current pixels having pixel values included in a first color range including a specific color range that defines a specific color, from the plurality of pixels; excluding, in second region different from a first region including a center region of the image, (i) a low saturation pixel from the plurality of first current pixels when the number of low saturation pixels is greater than or equal to a first threshold value, and (ii) a high saturation pixel, which has a pixel value included in a high saturation range, from the plurality of first current pixels when the number of high saturation pixels is greater than or equal to a second threshold value; and outputting a plurality of second current pixels obtained as a result of the excluding.

10 Claims, 15 Drawing Sheets

(51) Int. Cl.
*G06V 10/50* (2022.01)
*G06V 40/10* (2022.01)

(56) References Cited

U.S. PATENT DOCUMENTS

| | | | | |
|---|---|---|---|---|
| 6,023,524 | A | 2/2000 | Yamaguchi | |
| 7,580,169 | B2* | 8/2009 | Fukuda | H04N 1/62 |
| | | | | 358/448 |
| 2002/0076100 | A1 | 6/2002 | Luo | |
| 2005/0244072 | A1 | 11/2005 | Imai | |
| 2006/0012840 | A1 | 1/2006 | Fukuda | |
| 2011/0090369 | A1* | 4/2011 | Yanagita | H04N 25/60 |
| | | | | 348/241 |
| 2022/0130053 | A1* | 4/2022 | Funamoto | G06T 7/194 |

OTHER PUBLICATIONS

International Search Report dated Mar. 17, 2020 in International Application No. PCT/JP2020/001357; with partial English translation.

* cited by examiner

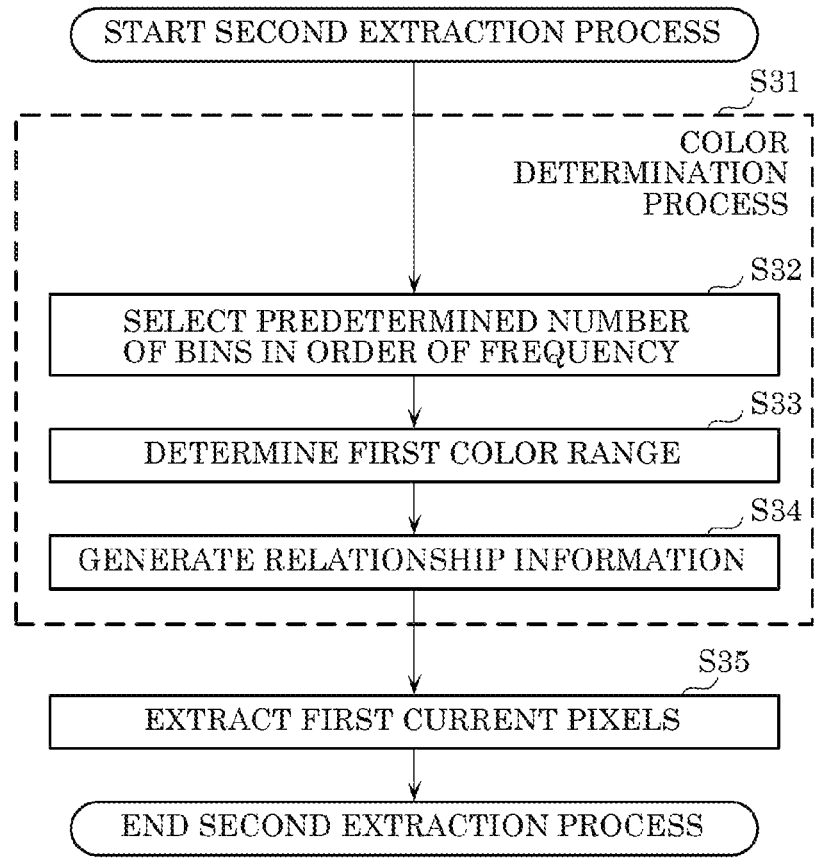
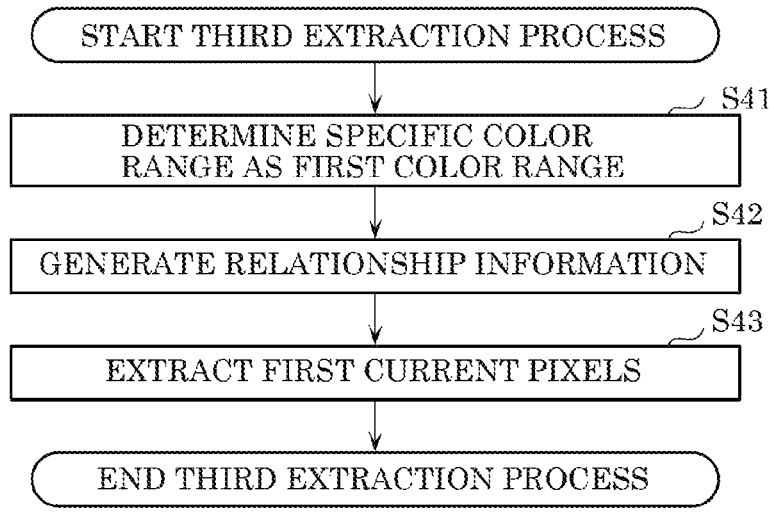

IMAGE PROCESSING METHOD, IMAGE PROCESSING DEVICE, AND RECORDING MEDIUM

CROSS-REFERENCE OF RELATED APPLICATIONS

This application is the U.S. National Phase under 35 U.S.C. § 371 of International Patent Application No. PCT/JP2020/001357, filed on Jan. 16, 2020, which in turn claims the benefit of Japanese Application No. 2019-101127, filed on May 30, 2019, the entire disclosures of which Applications are incorporated by reference herein.

TECHNICAL FIELD

The present disclosure relates to image processing methods, image processing devices, and recording media.

BACKGROUND ART

Patent Literature (PTL) 1 discloses an image processing method for detecting a human figure in a digital color image.

CITATION LIST

Patent Literature

PTL 1: Unexamined Patent Application Publication No. 2002-203239

SUMMARY OF THE INVENTION

Technical Problem

It is, however, problematic that with the image processing method disclosed in PTL 1, it is difficult to effectively identify a human figure region or the like that is used in a predetermined process.

The present disclosure provides an image processing method, etc., in which a target region that is the region of a subject in an image can be effectively identified.

Solution to Problem

An image processing method according to the present disclosure includes: obtaining an image; extracting a plurality of first current pixels from a plurality of pixels of the image obtained, based on a pixel value of each of the plurality of pixels, the plurality of first current pixels each having a pixel value included in a first color range including a specific color range that defines a specific color; excluding, in a second region different from a first region including a center region of the image, (i) a low saturation pixel from the plurality of first current pixels when a total number of low saturation pixels is greater than or equal to a first threshold value, and (ii) a high saturation pixel from the plurality of first current pixels when a total number of high saturation pixels is greater than or equal to a second threshold value, the low saturation pixel having a pixel value included in a low saturation range which is a range of saturation lower than first saturation, the high saturation pixel having a pixel value included in a high saturation range which is a range of saturation higher than second saturation higher than the first saturation; and outputting a plurality of second current pixels obtained as a result of the excluding.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Advantageous Effect of Invention

With an image processing method according to the present disclosure, a target region that is the region of a subject in an image can be effectively identified.

BRIEF DESCRIPTION OF DRAWINGS

FIG. 10 is a flowchart illustrating a specific example of a second extraction process.

FIG. 11 is a flowchart illustrating a specific example of a third extraction process.

DESCRIPTION OF EXEMPLARY EMBODIMENT

Figure 1:
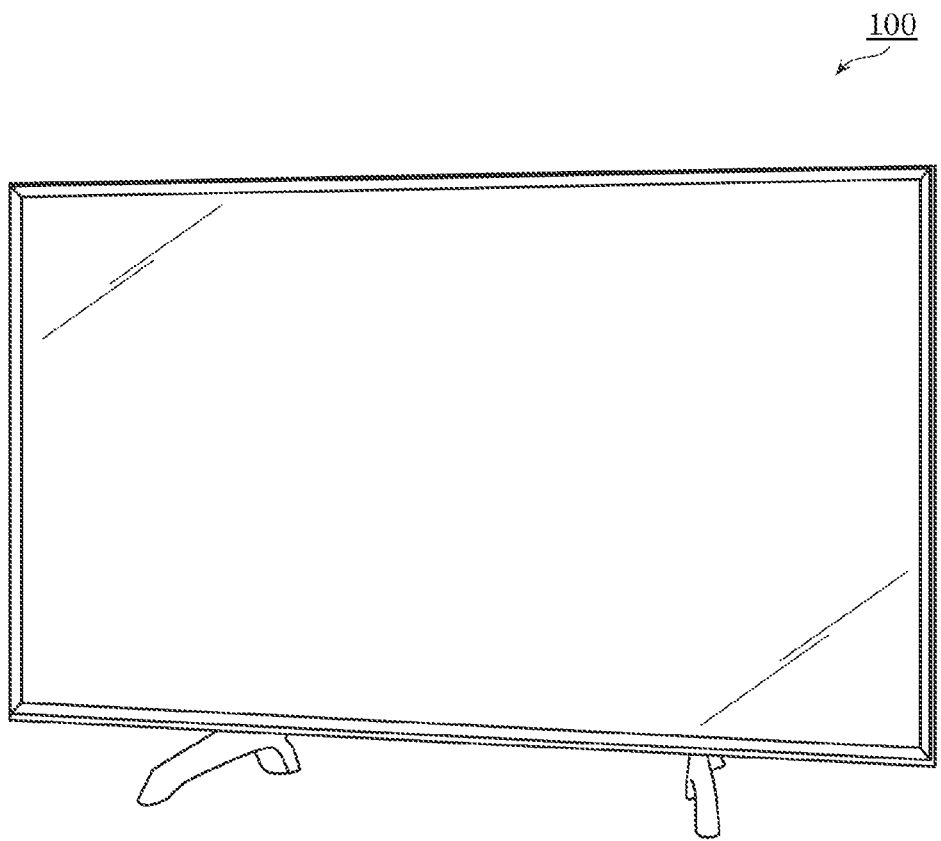
FIG. 1 is a perspective view illustrating one example of the external appearance of a display apparatus according to the present embodiment.

Hereinafter, an embodiment will be described in detail with reference to the drawings where appropriate. However, there are instances where overly detailed description will be omitted. For example, there are cases where detailed description of well-known matter or overlapping description of substantially identical elements will be omitted. This is in order to prevent the subsequent description from becoming overly verbose and to facilitate the understanding of a person having ordinary skill in the art.

Note that the accompanying drawings and the subsequent description have been provided by the inventor in order for a person having ordinary skill in the art to sufficiently understand the present disclosure, and thus they are not intended to limit the scope of the subject matter of the appended Claims.

Underlying Knowledge Forming Basis of the Present Disclosure

The inventor has found that the subsequent problem occurs with the image processing method described in the "BACKGROUND ART" section.

PTL 1 discloses that the skin of a human being is detected on the basis of human skin color distributions in the luminance and chrominance components.

In this manner, for example, a pixel having a pixel value within the range of a color region that defines a human skin color is detected to distinguish a human face region in an image. Furthermore, a human face region in an image is made distinguishable through image processing using a texture pattern and/or a spatial frequency. Moreover, image processing that uses a feature amount or a graphic model of a human figure is performed on a region near the human face distinguished in these methods, making it possible to recognize a human figure or identify a human figure region, for example.

As just described, in a conventional technique, a skin color is detected using a histogram of pixel values of all the pixels of an image, and thus when the image includes a background having a color within the range of skin colors, said background is detected as a skin color. Therefore, the background may be detected as a human face or a human skin.

In order to solve the aforementioned problem, an image processing method according to one aspect of the present disclosure includes: obtaining an image; extracting a plurality of first current pixels from a plurality of pixels of the image obtained, based on a pixel value of each of the plurality of pixels, the plurality of first current pixels each having a pixel value included in a first color range including a specific color range that defines a specific color; excluding, in a second region different from a first region including a center region of the image, (i) a low saturation pixel from the plurality of first current pixels when a total number of low saturation pixels is greater than or equal to a first threshold value, and (ii) a high saturation pixel from the plurality of first current pixels when a total number of high saturation pixels is greater than or equal to a second threshold value, the low saturation pixel having a pixel value included in a low saturation range which is a range of saturation lower than first saturation, the high saturation pixel having a pixel value included in a high saturation range which is a range of saturation higher than second saturation higher than the first saturation; and outputting a plurality of second current pixels obtained as a result of the excluding.

With this, using the concept of a point of gaze which represents image capture with a subject at the image center, the step of excluding is performed to exclude a predetermined pixel from the plurality of first current pixels each having a pixel value included in the first color range, according to the pixel value of each of the plurality of pixels in the second region in which the subject is not likely to appear. Specifically, when the number of low saturation pixels in the second region is greater than or equal to the first threshold value, the low saturation pixels are excluded, and when the number of high saturation pixels in the second region is greater than or equal to the second threshold value, the high saturation pixels are excluded from the plurality of first current pixels. In other words, even among the first current pixels, a low saturation pixel in the second region that has a value greater than or equal to the first threshold value and a high saturation pixel in the second region that has a value greater than or equal to the second threshold value are estimated as pixels of the background region different from the region of the subject and are excluded from the plurality of first current pixels; therefore, it is possible to reduce the occurrences of the background being detected as the subject. Accordingly, a target region that is the region of the subject in the image can be effectively identified.

Furthermore, the image processing method may further include: generating a histogram of saturation of the first region and a histogram of saturation of the second region as a first saturation histogram and a second saturation histogram, respectively; calculating a differential saturation histogram by subtracting the second saturation histogram from the first saturation histogram in each bin of corresponding saturation; obtaining a first pixel count and a second pixel count, the first pixel count being a result of counting a total number of pixels having pixel values included in the specific color range in the first region, the second pixel count being a result of counting a total number of pixels having pixel values included in the specific color range in the second region; and setting, when the first pixel count is greater than or equal to a third threshold value and the second pixel count is greater than or equal to a fourth threshold value, (i) when a third pixel count is greater than or equal to a fifth threshold value, the first threshold value to decease with an increase in a fourth pixel count, and (ii) when a fifth pixel count is greater than or equal to a sixth threshold value, the second threshold value to decease with an increase in a sixth pixel count, the third pixel count being a total number of pixels classified under the low saturation range in the differential saturation histogram calculated, the fourth pixel count being a total number of pixels classified under the low saturation range in the second saturation histogram, the fifth pixel count being a total number of pixels classified under the high saturation range in the differential saturation histogram, the sixth pixel count being a total number of pixels classified under the high saturation range in the second saturation histogram. The excluding may be performed using the first threshold value and the second threshold value that have been set.

With this, when the number of pixels each having a pixel value included in the specific color range is between the third threshold value and the fourth threshold value, inclusive, in each of the first region and the second region, this image can be estimated as including a large image of a subject. In the case of the image including the large image of the subject, when the third pixel count that is the number of pixels classified under the low saturation range in the differential saturation histogram is greater than or equal to the fifth threshold value, it is determined that there is a high probability that an object of a different type from the subject appears with low saturation pixels in the background, and thus the first threshold value is set small so that the low saturation pixels are more likely to be excluded. Similarly, in the case of the image including the large image of the subject, when the fourth pixel count that is the number of pixels classified under the high saturation range in the differential saturation histogram is greater than or equal to the sixth threshold value, it is determined that there is a high probability that an object of a different type from the subject appears with high saturation pixels in the background, and thus the second threshold value is set small so that the high saturation pixels are more likely to be excluded. Thus, when it is determined that there is a high probability that an image of an object of a different type from the subject is included, the threshold values are set so that probable low saturation pixels and/or high saturation pixels for said object are more likely to be excluded; therefore, it is possible to reduce the occurrences of the object included in the background being detected as the subject.

Furthermore, the setting may include: setting the first threshold value to a first fixed value when the third pixel count is less than the fifth threshold value; and setting the second threshold value to a second fixed value when the fifth pixel count is less than the sixth threshold value, each of the first fixed value and the second fixed value being predetermined.

With this, when the third pixel count is less than the fifth threshold value, it is determined that there is a low probability that an object of a different type from the subject appears with low saturation pixels in the background, and thus the first threshold value is set to the first fixed value so that the low saturation pixels are less likely to be excluded. Similarly, when the fourth pixel count is less than the sixth threshold value, it is determined that there is a low probability that an object of a different type from the subject appears with high saturation pixels in the background, and thus the second threshold value is set to the second fixed value so that the high saturation pixels are less likely to be excluded. Thus, when it is determined that there is a low probability that an image of an object of a different type from the subject is included, the threshold values are set to the fixed values so that probable low saturation pixels and/or high saturation pixels for said object are less likely to be excluded; therefore, it is possible to reduce the occurrences of a portion of the subject being excluded as the background.

Furthermore, the extracting may include performing a first extraction process, the first extraction process may include: obtaining a first hue histogram and a second hue histogram, the first hue histogram being a result of generating a hue histogram of the first region, the second hue histogram being a result of generating a hue histogram of the second region; calculating a differential hue histogram by subtracting the second hue histogram from the first hue histogram in each bin of corresponding hue; determining, as a current hue histogram, the differential hue histogram calculated; performing a color range determination process for determining the first color range using the current hue histogram determined; and extracting, as the plurality of first current pixels, a plurality of pixels each having a pixel value included in the first color range determined, and the color range determination process may include: selecting a predetermined number of bins in descending order of frequency from among a plurality of bins remaining after excluding one or more specific bins determined as having the specific color from a plurality of bins included in the current hue histogram; and determining, as the first color range, a hue range specified by the predetermined number of bins selected and the one or more specific bins.

Thus, it is possible to determine, as the first color range, a color range including not only specific colors unique to the subject, but also colors that frequently appear in the subject.

Furthermore, the extracting may further include: counting a total number of pixels determined as having the specific color in the first region, and outputting, as the first pixel count, the total number of pixels counted; counting a total number of pixels determined as having the specific color in the second region, and outputting, as the second pixel count, the total number of pixels counted; and performing the first extraction process when the first pixel count is less than a seventh threshold value and the second pixel count is greater than or equal to an eighth threshold value, and performing a second extraction process when the first pixel count is greater than or equal to the seventh threshold value and the second pixel count is less than the eighth threshold value, and the second extraction process may include: obtaining the first hue histogram; and performing the color range determination process on the first hue histogram obtained, and extracting the plurality of first current pixels having the pixel values included in the first color range determined.

Thus, when the number of pixels in the first region that are determined as having the specific color is large, specifically, greater than or equal to the seventh threshold value, and the number of pixels in the second region that are determined as having the specific color is small, specifically, less than the eighth threshold value, the first region includes many pixels of the specific color, and therefore it can be estimated that the first region includes an image of a larger portion of the subject than the second region does. Accordingly, by performing the color range determination process on the first hue histogram of the first region, it is possible to determine, as the first color range, a color range including a color that frequently appears in the subject.

Furthermore, the extracting may include performing a third extraction process when first pixel count is less than a ninth threshold value less than the seventh threshold value and the second pixel count is less than a tenth threshold value less than the eighth threshold value, and the third extraction process may include determining the specific color range as the first color range; and extracting the plurality of first current pixels having the pixel values included in the first color range determined.

When the number of pixels in the first region that are determined as having the specific color is small, specifically, less than the ninth threshold value, and the number of pixels in the second region that are determined as having the specific color is small, specifically, less than the tenth threshold value, the specific color less frequently appears in both the first region and the second region, and therefore it can be estimated that an image of a small portion of the subject is included in the whole image. Thus, it is possible to effectively detect the subject by determining the specific color range as the first color range.

Furthermore, the extracting may further include: generating a hue histogram of each of the first region and the second region; and outputting the hue histogram of the first region and the hue histogram of the second region as the first hue histogram and the second hue histogram, respectively.

Furthermore, the specific color may be a human skin color.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

EMBODIMENT

Hereinafter, an embodiment will be described with reference to FIG. 1 to FIG. 15.

[Configuration and Operation]

FIG. 1 is a perspective view illustrating one example of the external appearance of a display apparatus according to the present embodiment.

As illustrated in FIG. 1, the external appearance of display apparatus 100 is that of a general flat-panel display in which a display device including a display panel is housed in a casing. Display apparatus 100 is, for example, a liquid-crystal display or an organic electroluminescent (EL) display.

Figure 2:
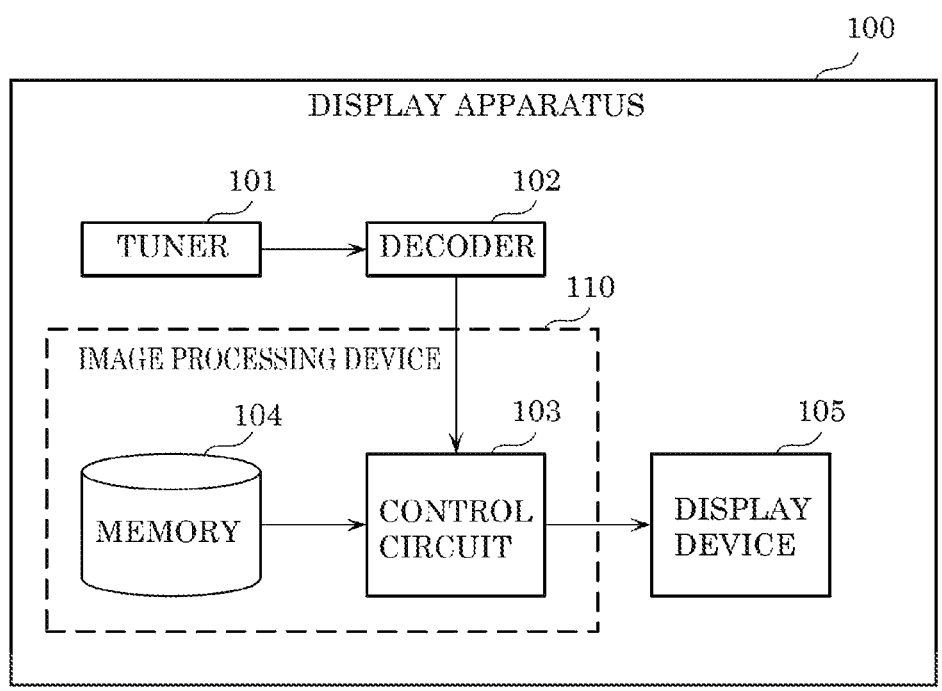
FIG. 2 is a block diagram illustrating one example of the hardware configuration of a display apparatus according to the present embodiment.

FIG. 2 is a block diagram illustrating one example of the hardware configuration of a display apparatus according to the present embodiment.

As illustrated in FIG. 2, display apparatus 100 includes tuner 101, decoder 102, control circuit 103, memory 104, and display device 105. Control circuit 103 and memory 104 constitute image processing device 110. In other words, display apparatus 100 is an apparatus into which image processing device 110 is built-in.

Tuner 101 converts an analog signal that is included in airwaves received from an antenna not illustrated in the drawings, into encoded data that is a digital signal, and outputs, to decoder 102, the encoded data obtained by conversion.

Decoder 102 decodes the encoded data obtained from tuner 101, and outputs, to control circuit 103, image data obtained by decoding. The image data represents an image including a moving image or a still image.

Control circuit 103 performs a predetermined image process on the image represented by the image data output by decoder 102. When the image is a moving image, control circuit 103 performs the predetermined image process on each of a plurality of pictures included in the moving image. When the image is a still image, control circuit 103 performs the predetermined image process on the still image. Control circuit 103 outputs, to display device 105, image data (hereinafter referred to as "image-processed image data") representing an image (hereinafter referred to as an "image-processed image") obtained by performing the image process. Thus, display device 105 can display the image-processed image. Note that decoder 102 and control circuit 103 may be provided as the same circuit. Furthermore, control circuit 103 may be provided as a general-purpose processor such as a central processing unit (CPU) that performs a predetermined control program or may be provided as a dedicated circuit. In other words, the functions of display apparatus 100 may be implemented using software or may be implemented using hardware.

Memory 104 may store a control program and various data to be used to perform the control program. Memory 104 is, for example, a non-volatile memory.

Display device 105 displays the image-processed image represented by the image-processed image data output by control circuit 103. Display device 105 is a display panel and includes, for example, a liquid-crystal panel or an organic EL panel.

Next, the functional configuration of the image processing device will be described.

Figure 3:
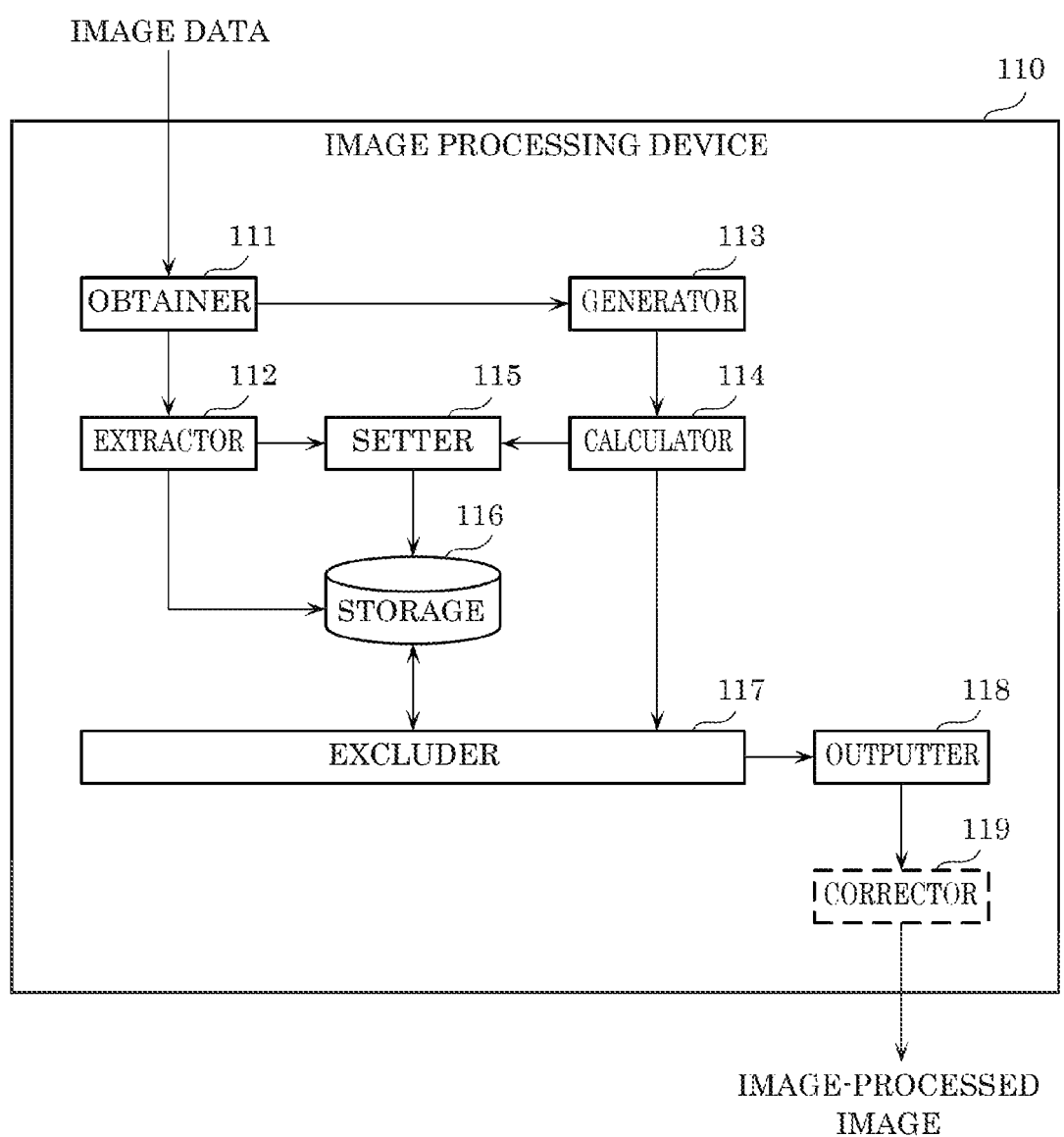
FIG. 3 is a block diagram illustrating one example of the functional configuration of an image processing device according to the present embodiment.
Figure 4:
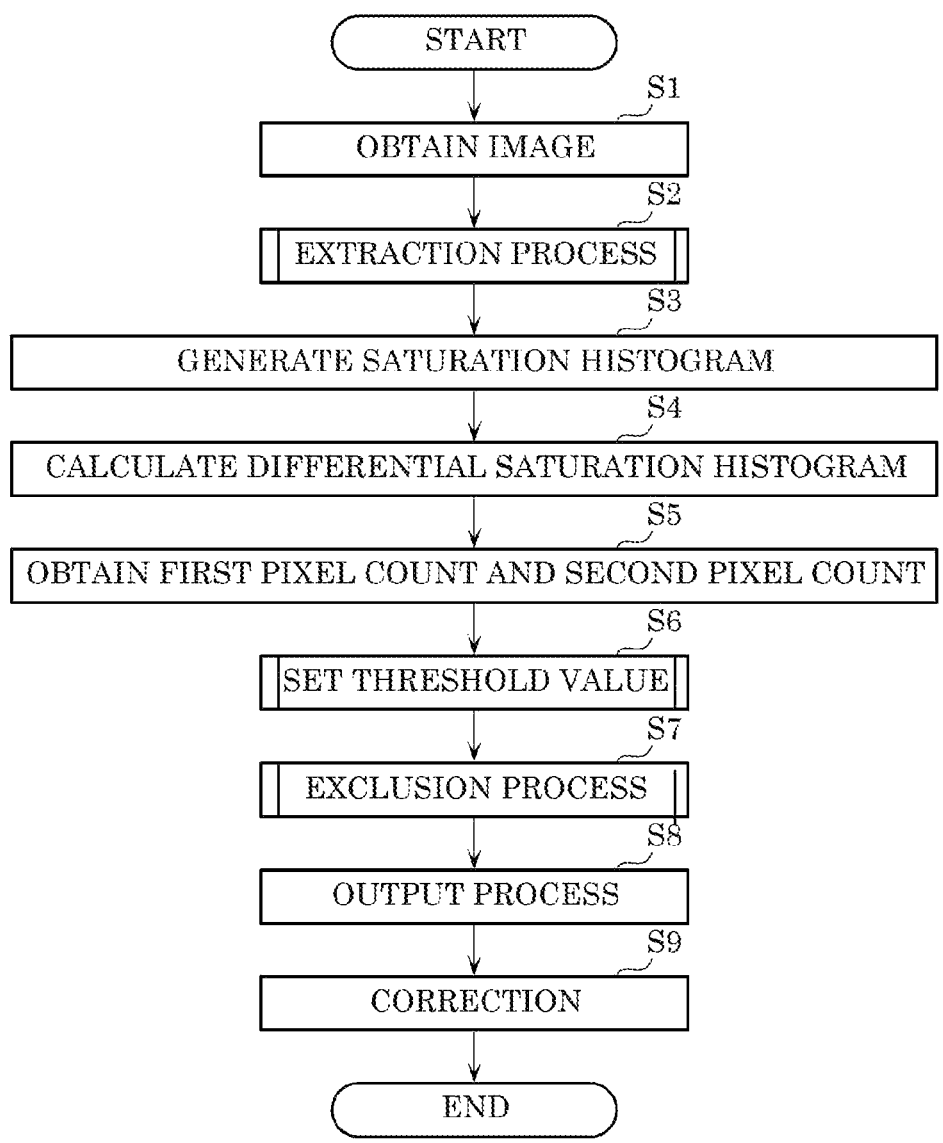
FIG. 4 is a flowchart illustrating one example of an image processing method performed by an image processing device according to the present embodiment.

FIG. 3 is a block diagram illustrating one example of the functional configuration of the image processing device according to the present embodiment. FIG. 4 is a flowchart illustrating one example of an image processing method performed by the image processing device according to the present embodiment.

Here, the function blocks of image processing device 110 will be described with reference to FIG. 3, and the flow of processes performed in the function blocks will be described with reference to FIG. 4.

As illustrated in FIG. 3, image processing device 110 includes, as the functional configuration, obtainer 111, extractor 112, generator 113, calculator 114, setter 115, storage 116, excluder 117, outputter 118, and corrector 119.

Obtainer 111 obtains the image data (S1). Obtainer 111 obtains the image by obtaining the image data from decoder 102 of display apparatus 100, for example.

On the basis of the pixel values of a plurality of pixels include in the image obtained by obtainer 111, extractor 112 performs an extraction process in which a plurality of first current pixels each having a pixel value included in a first color range are extracted from the plurality of pixels (S2). A specific example of the extraction process will be described later with reference to FIG. 6.

The first color range is a range of colors including a specific color range in which a specific color is defined. The specific color is a human skin color in the present embodiment. The human skin color is, for example, any human skin color that exists in the world. In other words, the specific color range is a range of colors defined by a union including all skin colors including black-based, white-based, and yellow-based colors. More specifically, the range of colors is defined, for example, by the HLS color space indicated with the use of three indexes, i.e., hue, saturation, and luminance. Note that the range of colors is not limited to being defined by this HLS color space and may be defined by other color spaces indicated with the use of at least two indexes, i.e., hue and saturation, such as the HSV color space.

Here, the first region and the second region in the image will be described with reference to FIG. 5.

Figure 5:
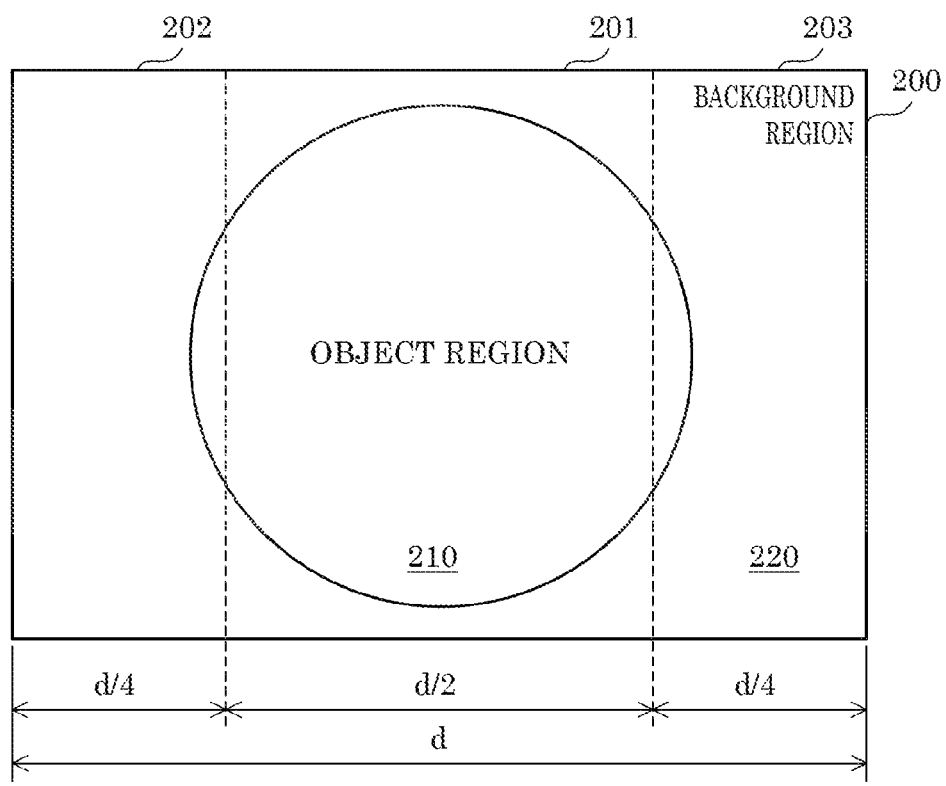
FIG. 5 is a diagram for describing regions in an image.

FIG. 5 is a diagram for describing regions in the image.

As illustrated in FIG. 5, image 200 is divided into regions, namely, first region 201 including the center region of image 200 and second regions 202, 203 remaining after excluding first region 201 from image 200. First region 201 and second regions 202, 203 do not overlap each other. First region 201 and second regions 202, 203 are regions obtained by horizontally dividing image 200. First region 201 has a width equal to half of horizontal width d of image 200 and is located at the center of image 200. Second region 202 is located on the left side of first region 201 in the horizontal direction and has a width equal to one fourth of width d of image 200. Second region 203 is located on the right side of first region 201 in the horizontal direction and has a width equal to one fourth of width d of image 200. The vertical widths of first region 201 and second regions 202, 203, which are obtained by horizontally dividing image 200 into thirds as mentioned above, are equal to the vertical width of image 200.

Note that first region 201 is defined here as the center region of image 200 horizontally divided into thirds, but is not limited to this example; it is sufficient that first region 201 be a region including the center region of image 200. Specifically, among the plurality of regions, nine regions, obtained by dividing image 200 into thirds each in the vertical direction and the horizontal direction, one center region may be defined as the first region, three regions located at the center in the horizontal direction may be defined as the first regions, or three regions located at the center in the vertical direction may be defined as the first regions. Furthermore, the shape of first region 201 is not limited to a rectangle as long as first region 201 is a region including the center region of image 200; first region 201 may be a region of other shapes including a circle and an oval.

Note that when the point of gaze is taken into consideration, the subject is often captured at a position in object region 210 which is the center region of image 200. In other words, the subject is mostly included in object region 210 of image 200 and not included in background region 220 around object region 210. Therefore, by considering the fact that the subject is mostly included in first region 201 and seldom included in second regions 202, 203, it is possible to effectively identify the region of the subject in image 200.

Figure 6:
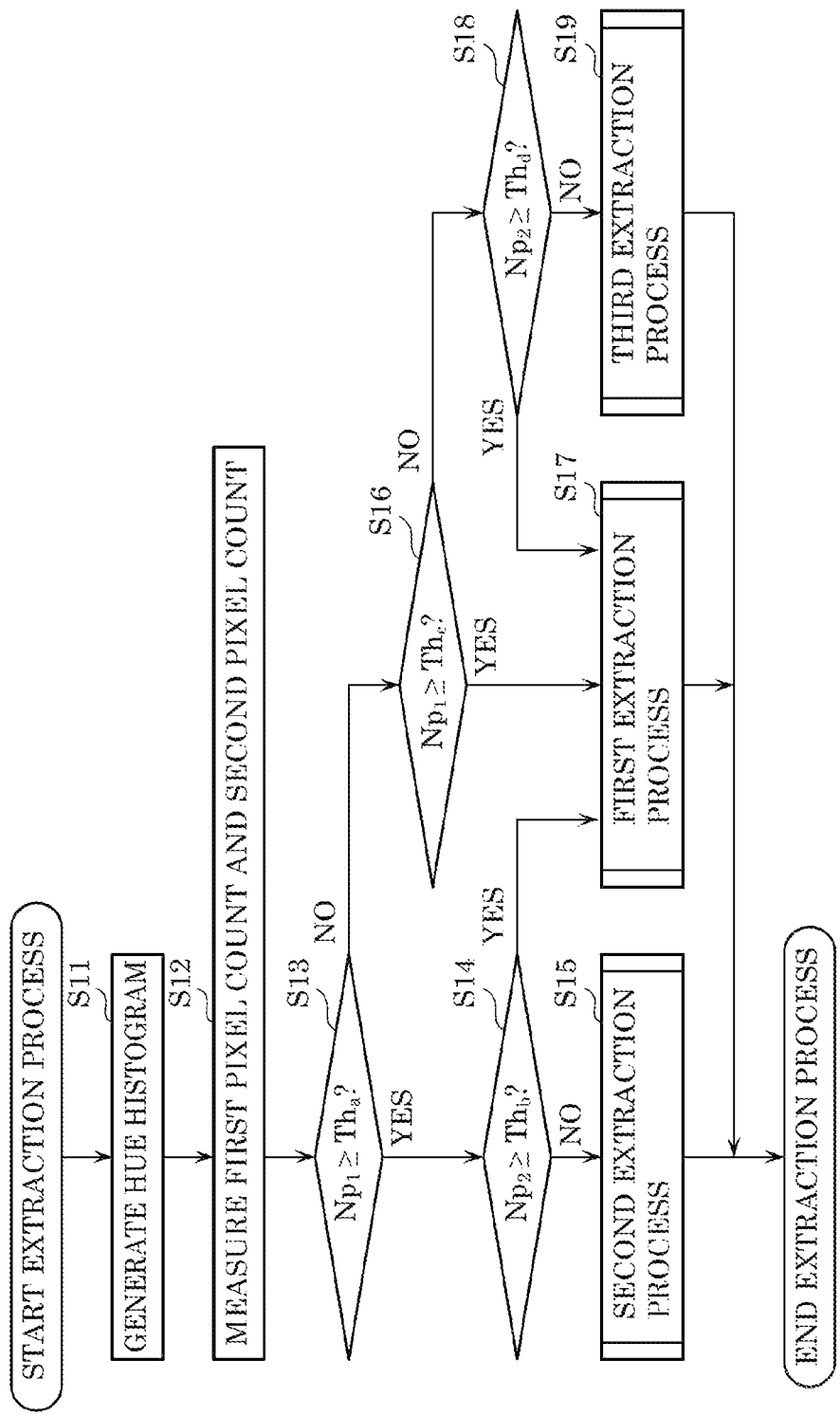
FIG. 6 is a flowchart illustrating a specific example of an extraction process.

Next, a specific example of the extraction process will be described with reference to FIG. 6. FIG. 6 is a flowchart illustrating the specific example of the extraction process.

In the extraction process, extractor 112 performs one of the first extraction process, the second extraction process, and the third extraction process using the generated first and second hue histograms, and extracts the plurality of first current pixels from the plurality of pixels of the image. Extractor 112 selects one extraction process from among the first extraction process, the second extraction process, and the third extraction process, in accordance with a first pixel count which is the number of pixels in the first region that are determined as having a specific color and a second pixel count which is the number of pixels in the second region that are determined as having a specific color, and performs the selected extraction process.

Specifically, as illustrated in FIG. 6, extractor 112 generates a histogram of hue of the first region of the image and a histogram of hue of the second region of the image as the first hue histogram and the second hue histogram, respectively (S11). Extractor 112 calculates hue of each of the plurality of pixels in first region 201 from the pixel value of the pixel, counts pixels in each of predetermined hue ranges, and thus generates the first hue histogram. Similarly, extractor 112 calculates hue of each of the plurality of pixels in second regions 202, 203 from the pixel value of the pixel, counts pixels in each of predetermined hue ranges, and thus generates the second hue histogram.

Figure 7:
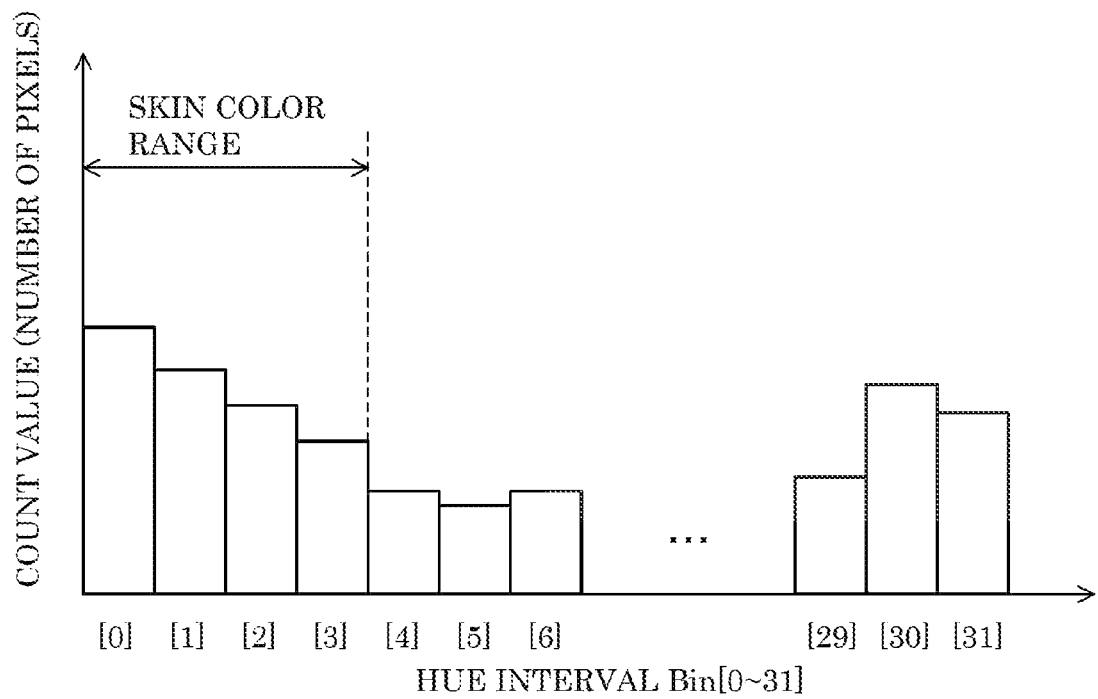
FIG. 7 is a diagram illustrating one example of a hue histogram.

The first hue histogram and the second hue histogram are graphs with the number of pixels in frequencies and the hue ranges in bins, as illustrated in FIG. 7, for example. The first hue histogram and the second hue histogram are graphs representing the distribution of pixels in hue ranges. Note that FIG. 7 is a diagram illustrating one example of a hue histogram.

In the present embodiment, the first hue histogram and the second hue histogram have 32 bins arranged in one-to-one correspondence with 32 hue ranges obtained by dividing the whole hue range into 32 subranges. For example, in the hue histogram, hue ranges Bin [0] to Bin [3] are defined as a specific hue range determined as having a specific color. Note that the first hue histogram and the second hue histogram are not limited to a configuration in which one bin is provided for each of predetermined hue ranges, such as that illustrated in FIG. 7, and may be configured to have one bin for each value of hue.

Subsequently, extractor 112 counts the number of pixels in a specific hue range using the first hue histogram as first pixel count $Np_1$ for first region 201. Furthermore, extractor 112 counts the number of pixels in a specific hue range using the second hue histogram as second pixel count $Np_2$ for second regions 202, 203 (S12). Note that second pixel count $Np_2$ is the number of pixels in the specific hue range in second region 202 and second region 203 combined. In the present embodiment, a pixel determined as having a specific color is a pixel having a pixel value in a specific hue range.

Next, extractor 112 determines whether or not first pixel count $Np_1$ is greater than or equal to threshold value $Th_a$ (S13). When extractor 112 determines that first pixel count $Np_1$ is greater than or equal to threshold value $Th_a$ (YES in S13), extractor 112 performs Step S14, and when extractor 112 determines that first pixel count $Np_1$ is less than threshold value $Th_a$ (NO in S13), extractor 112 performs Step S16. Note that threshold value $Th_a$ is one example of the seventh threshold value.

In Step S14, extractor 112 determines whether or not second pixel count $Np_2$ is greater than or equal to threshold value $Th_b$ (S14). When extractor 112 determines that second pixel count $Np_2$ is greater than or equal to threshold value $Th_b$ (YES in S14), extractor 112 performs Step S17, and when extractor 112 determines that second pixel count $Np_2$ is less than threshold value $Th_b$ (NO in S14), extractor 112 performs Step S15. Note that threshold value $Th_b$ is one example of the eighth threshold value.

In Step S15, extractor 112 performs the second extraction process (S15). A specific example of the second extraction process will be described later with reference to FIG. 10.

In Step S16, extractor 112 determines whether or not first pixel count $Np_1$ is greater than or equal to threshold value $Th_c$ (S16). When extractor 112 determines that first pixel count $Np_1$ is greater than or equal to threshold value $Th_c$ (YES in S16), extractor 112 performs Step S17, and when extractor 112 determines that first pixel count $Np_1$ is less than threshold value $Th_c$ (NO in S16), extractor 112 performs Step S18. Note that threshold value $Th_c$ is smaller than threshold value $Th_a$ and is one example of the ninth threshold value.

In Step S17, extractor 112 performs the first extraction process (S17). A specific example of the first extraction process will be described later with reference to FIG. 8.

In Step S18, extractor 112 determines whether or not second pixel count $Np_2$ is greater than or equal to threshold value $Th_d$ (S18). When extractor 112 determines that second pixel count $Np_2$ is greater than or equal to threshold value $Th_d$ (YES in S18), extractor 112 performs Step S17, and when extractor 112 determines that second pixel count $Np_2$ is less than threshold value $Th_d$ (NO in S18), extractor 112 performs Step S19. Note that threshold value $Th_d$ is smaller than threshold value $Th_b$ and is one example of the tenth threshold value.

In Step S19, extractor 112 performs the third extraction process. A specific example of the third extraction process will be described with reference to FIG. 11.

As described above, when first pixel count Np 1 is greater than or equal to threshold value $Th_a$ and second pixel count $Np_2$ is greater than or equal to threshold value $Th_b$, extractor 112 performs the second extraction process. Furthermore, when first pixel count $Np_1$ is less than threshold value $Th_c$ and second pixel count $Np_2$ is less than threshold value $Th_d$, extractor 112 performs the third extraction process. Moreover, when the condition for performing the second extraction process is not satisfied and the condition for performing the third extraction process is not satisfied, extractor 112 performs the first extraction process. Specifically, (i) when first pixel count Np 1 is greater than or equal to threshold value $Th_e$, but less than threshold value $Th_a$, (ii) when first pixel count $Np_1$ is greater than or equal to threshold value $Th_a$ and second pixel count $Np_2$ is greater than or equal to threshold value $Th_b$, or (iii) when first pixel count $Np_1$ is less than threshold value $Th_c$ and second pixel count $Np_2$ is greater than or equal to threshold value $Th_d$, extractor 112 performs the first extraction process. Thus, when first pixel count $Np_1$ is greater than or equal to threshold value $Th_e$, but less than threshold value $Th_a$ or second pixel count $Np_2$ is greater than or equal to threshold value $Th_b$, extractor 112 performs the first extraction process.

Figure 8:
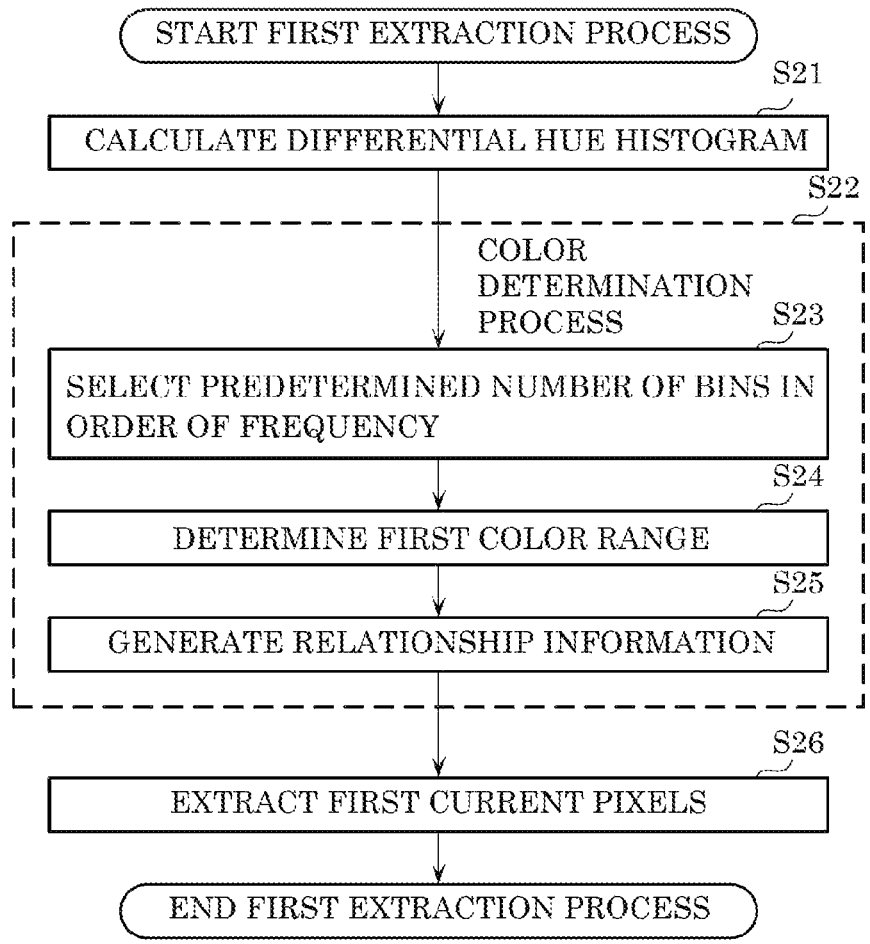
FIG. 8 is a flowchart illustrating a specific example of a first extraction process.

The first extraction process will be described with reference to FIG. 8. FIG. 8 is a flowchart illustrating a specific example of the first extraction process.

In the first extraction process, first, extractor 112 obtains the generated first and second hue histograms, and calculates a differential hue histogram by subtracting the obtained second hue histogram from the obtained first hue histogram in each bin of corresponding hue (S21). Specifically, for each of 32 pairs of bins of the first hue histogram and the second hue histogram where the hue ranges correspond to each other, extractor 112 subtracts the frequencies (the number of pixels) in a bin included in the second hue histogram from the frequencies (the number of pixels) in a bin included the first hue histogram, and thus newly generates 32 bins of the hue ranges. Extractor 112 calculates, as the differential hue histogram, a histogram having the 32 newly generated bins. Note that when the result of subtracting the frequencies (the number of pixels) in a bin included in the second hue histogram from the frequencies (the number of pixels) in a bin included in the first hue histogram is a negative value, the frequencies in the newly generated bin of the hue range may be set to zero or may be left unchanged as the negative value.

Extractor 112 determines the calculated differential hue histogram as a current hue histogram. Subsequently, extractor 112 performs a color range determination process for determining the first color range using the determined current hue histogram (S22).

Figure 9:
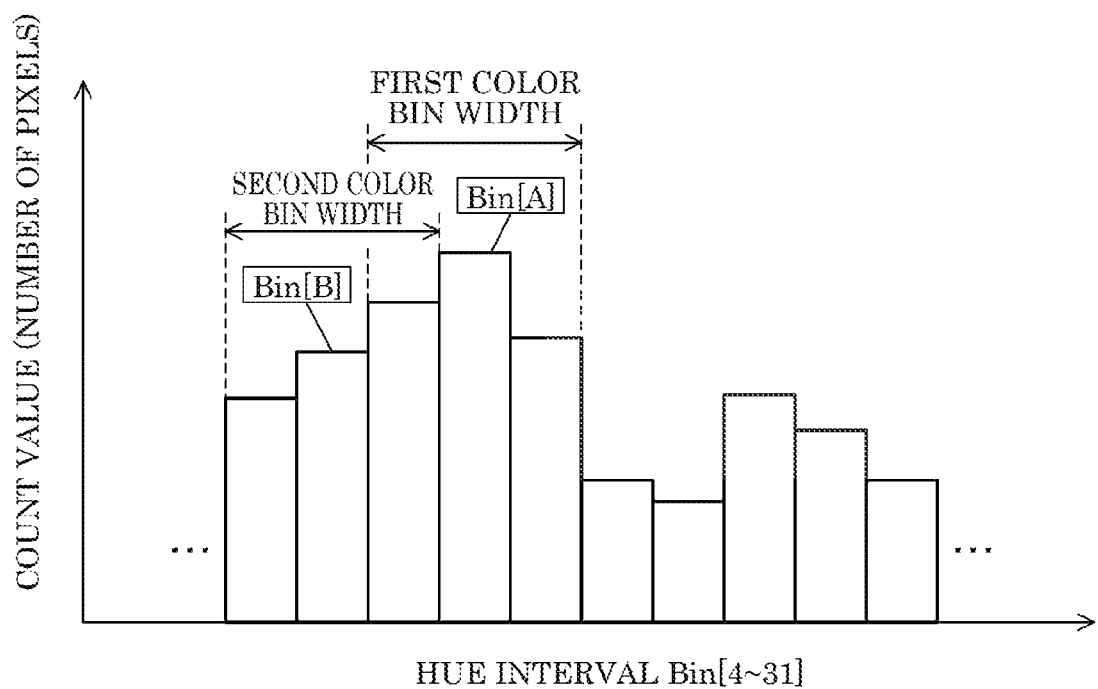
FIG. 9 is a diagram illustrating one example of a hue histogram for describing a color determination process.

In the color range determination process, extractor 112 selects a predetermined number of bins in descending order of frequency from among a plurality of bins remaining after excluding one or more specific bins determined as having a specific color from the plurality of bins (in the present embodiment, 32 bins) included in the current hue histogram (S23). Here, a color determination process will be specifically described with reference to FIG. 9. Note that FIG. 9 is a diagram illustrating one example of the hue histogram for describing the color determination process. In the case of the hue histogram illustrated in FIG. 9, Bin [0] to Bin [3], which are a specific hue range, are excluded. Note that when the specific color is different from a human skin color, a specific hue range corresponding to the different color will be excluded. The color range determination process is the process of selecting, in descending order of frequency, colors appearing in the differential hue histogram other than the specific color. Note that setting the hue range from Bin [0] to Bin [3] to the specific hue range is a mere example; the specific hue range is not limited to the aforementioned range. Furthermore, in the color range determination process, in the case of excluding the specific hue range, the bins to be excluded are not limited to Bin [0] to Bin [3] which are the specific hue range; a hue range narrower than the specific hue range, Bin [0] to Bin [2], may be excluded.

First, extractor 112 selects a first color that most frequently appears other than the specific color. In the selecting of the first color, first, extractor 112 selects a bin with the highest frequency (Bin [A]) from the hue histogram with the specific hue range removed, for example. Subsequently, extractor 112 selects, as the bins for the first color, bins (in the present embodiment, three bins) having a bin width that is the widths of a predetermined number of bins based on the selected bin (Bin [A]). In the example of FIG. 9, extractor 112 selects, as the bins for the first color, three bins including the bin with the highest frequency and two adjacent bins on both sides thereof.

Next, in the case of selecting a second color different from the first color, extractor 112 selects a bin with the highest frequency (Bin [B]) from among the plurality of bins except the three bins selected as the bins for the first color. Subsequently, in the selecting the second color, extractor 112 selects, as the bins for the second color, bins having a predetermined bin width based on the selected bin (Bin [B]). In the example of FIG. 9, extractor 112 selects, as the bins for the second color, three bins including the bin with the highest frequency and two adjacent bins on both sides thereof. In this case, one of the three bins selected in the selecting of the second color overlaps one of the three bins already selected in the selecting of the first color.

In this manner, extractor 112 selects, in descending order of frequency, colors that frequently appear in the differential hue histogram other than the specific color. The present embodiment exemplifies the case where two colors, the first color and the second color, are selected other than the specific color. Note that in the next case of further selecting a third color different from the first color and the second color, a bin with the highest frequency among the plurality of bins except the five bins selected as the bins for the first and second colors will be selected. Hereinafter, substantially the same process will be repeated.

Subsequently, extractor 112 determines, as the first color range, a hue range specified by the predetermined number of selected bins and one or more specific bins (S24).

Next, when the first color range is determined, extractor 112 generates relationship information indicating the relationship between the hue range and the pixel value, for setting a pixel value included in the determined first color range to the maximum value, for example, setting a pixel value included in a range located outside said color range across a range having a predetermined width to the minimum value, for example, and setting a pixel value in the range having the predetermined width outside said color range to a value decreasing from the maximum value to the minimum value with an increase in the distance to the determined color range (S25). Note that in generating the relationship information, extractor 112 may set pixel value P1 instead of the maximum value of the pixel value and set pixel value P2 smaller than pixel value P1 instead of the minimum value of the pixel value. Furthermore, pixel value P1 and pixel value P2 may be set to different values per color.

Next, extractor 112 extracts, as the plurality of first current pixels, a plurality of pixels included in the plurality of pixels of image 200 and each having a pixel value included in the first color range determined in the color range determination process (S26). Specifically, extractor 112 converts, for each of the plurality of pixels of the image, the pixel value of the pixel into a pixel value associated with a color (hue) based on the pixel value in the relationship information for the color, and thus generates a first color image made up of pixels having pixel values indicating that a pixel having a larger value is more likely to have a color in the first hue range, in other words, a pixel having a larger value is more likely to be the first current pixel. Using the first color image, extractor 112 can extract, as the plurality of first current pixels, a set of pixels having pixel values greater than or equal to a predetermined threshold value.

Next, the second extraction process will be described with reference to FIG. 10. FIG. 10 is a flowchart illustrating a specific example of the second extraction process.

In the second extraction process, first, extractor 112 obtains the generated first hue histogram, and performs the color range determination process using the obtained first hue histogram (S31). Note that in the color range determination process in Step S31, substantially the same process as the color range determination process in Step S22 is performed.

In the color range determination process, extractor 112 selects a predetermined number of bins in descending order of frequency from among a plurality of bins remaining after excluding one or more specific bins determined as having a specific color from the plurality of bins (in the present embodiment, 32 bins) included in the current hue histogram (S32).

Extractor 112 determines, as the first color range, a hue range specified by the predetermined number of selected bins and one or more specific bins (S33).

Next, when the firsts color range is determined, extractor 112 generates relationship information indicating the relationship between the hue range and the pixel value, for setting a pixel value included in the determined first color range to the maximum value, for example, setting a pixel value included in a range located outside said color range across a range having a predetermined width to the minimum value, for example, and setting a pixel value in the range having the predetermined width outside said color range to a value decreasing from the maximum value to the minimum value with an increase in the distance to the determined color range (S34). Note that in generating the relationship information, extractor 112 may set pixel value P1 instead of the maximum value of the pixel value and set pixel value P2 smaller than pixel value P1 instead of the minimum value of the pixel value. Furthermore, pixel value P1 and pixel value P2 may be set to different values per color.

Extractor 112 extracts, as the plurality of first current pixels, a plurality of pixels included in the plurality of pixels of image 200 and each having a pixel value included in the first color range determined in the color range determination process (S35). Specifically, extractor 112 converts, for each of the plurality of pixels of the image, the pixel value of the pixel into a pixel value associated with a color (hue) based on the pixel value in the relationship information for the color, and thus generates a first color image made up of pixels having pixel values indicating that a pixel having a larger value is more likely to have a color in the first hue range, in other words, a pixel having a larger value is more likely to be the first current pixel. Using the first color image, extractor 112 can extract, as the plurality of first current pixels, a set of pixels having pixel values greater than or equal to a predetermined threshold value.

Next, the third extraction process will be described with reference to FIG. 11. FIG. 11 is a flowchart illustrating a specific example of the third extraction process.

In the third extraction process, extractor 112 determines a specific color range as the first color range (S41).

Next, when the firsts color range is determined, extractor 112 generates relationship information indicating the relationship between the hue range and the pixel value, for setting a pixel value included in the determined first color range to the maximum value, for example, setting a pixel value included in a range located outside said color range across a range having a predetermined width to the minimum value, for example, and setting a pixel value in the range having the predetermined width outside said color range to a value decreasing from the maximum value to the minimum value with an increase in the distance to the determined color range (S42). Note that in generating the relationship information, extractor 112 may set pixel value P1 instead of the maximum value of the pixel value and set pixel value P2 smaller than pixel value P1 instead of the minimum value of the pixel value. Furthermore, pixel value P1 and pixel value P2 may be set to different values per color.

Subsequently, extractor 112 extracts, as the plurality of first current pixels, a plurality of pixels included in the plurality of pixels of image 200 and each having a pixel value included in the first color range determined (S43). Specifically, extractor 112 converts, for each of the plurality of pixels of the image, the pixel value of the pixel into a pixel value associated with a color (hue) based on the pixel value in the relationship information for the color, and thus generates a first color image made up of pixels having pixel values indicating that a pixel having a larger value is more likely to have a color in the first hue range, in other words, a pixel having a larger value is more likely to be the first current pixel. Using the first color image, extractor 112 can extract, as the plurality of first current pixels, a set of pixels having pixel values greater than or equal to a predetermined threshold value.

Extractor 112 may specify, as a first color region, a region of the image occupied by the plurality of first current pixels extracted. The plurality of first current pixels extracted by extractor 112 or the first color region specified by extractor 112 is output to storage 116. Storage 116 stores the output first color region. Furthermore, the first pixel count and the second pixel count measured by extractor 112 are output to setter 115.

Referring back to FIG. 3 and FIG. 4, this description continues.

Generator 113 generates, as a first saturation histogram and a second saturation histogram, histograms of saturation of the first region and the second region in the image obtained by obtainer 111 (S3). Generator 113 generates the first saturation histogram by calculating, from the pixel value of each of the plurality of pixels in the first region, the saturation of the pixel, and counting pixels in each range of predetermination saturation. Similarly, generator 113 generates the second saturation histogram by calculating, from the pixel value of each of the plurality of pixels in the second region, the saturation of the pixel, and counting pixels in each range of predetermination saturation.

Figure 12:
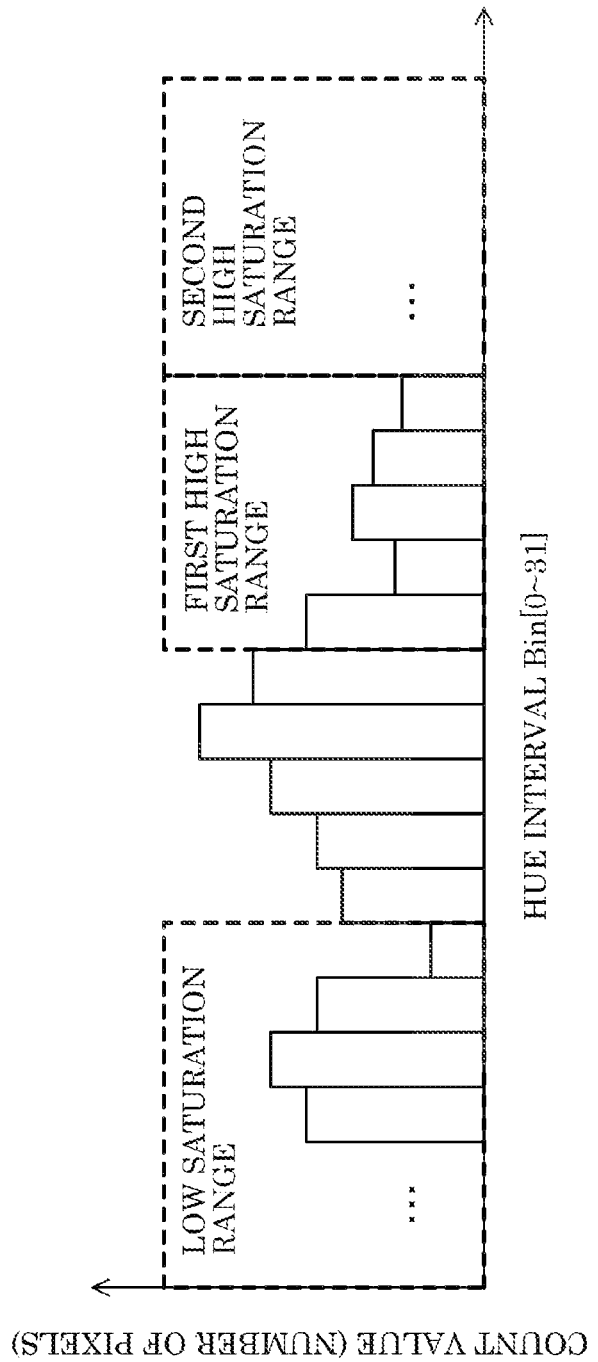
FIG. 12 is a diagram illustrating one example of a saturation histogram.

The first saturation histogram and the second saturation histogram are graphs with the number of pixels in frequencies and the saturation ranges in classes, as illustrated in FIG. 12, for example. The first saturation histogram and the second saturation histogram are graphs representing the distribution of pixels in saturation ranges. The first saturation histogram and the second saturation histogram generated by generator 113 are output to calculator 114. Note that FIG. 12 is a diagram illustrating one example of the saturation histogram.

In the present embodiment, the first saturation histogram and the second saturation histogram have 32 bins arranged in one-to-one correspondence with 32 saturation ranges obtained by dividing the whole saturation range into 32 subranges. Note that the first saturation histogram and the second saturation histogram are not limited to having one bin for each of predetermined saturation ranges and may have one bin for each value of saturation.

Calculator 114 calculates a differential saturation histogram by subtracting the second saturation histogram generated by generator 113 from the first saturation histogram generated by generator 113 in each bin of corresponding saturation (S4). Specifically, for each of 32 pairs of bins of the first saturation histogram and the second saturation histogram where the saturation ranges correspond to each other, calculator 114 subtracts the frequencies (the number of pixels) in a bin included in the second saturation histogram from the frequencies (the number of pixels) in a bin included the first saturation histogram, and thus newly generates 32 bins of the saturation ranges. Calculator 114 calculates, as the differential saturation histogram, a histogram having the 32 newly generated bins. Note that when the result of subtracting the frequencies (the number of pixels) in a bin included in the second saturation histogram from the frequencies (the number of pixels) in a bin included in the first saturation histogram is a negative value, the frequencies in the newly generated bin of the saturation range may be set to zero or may be left unchanged as the negative value. The differential saturation histogram calculated by calculator 114 is output to setter 115 and excluder 117.

Setter 115 obtains the first pixel count and the second pixel count which are the results of counting pixels having pixels values included in the specific color range in first region 201 and second regions 202, 203 (S5).

Figure 13:
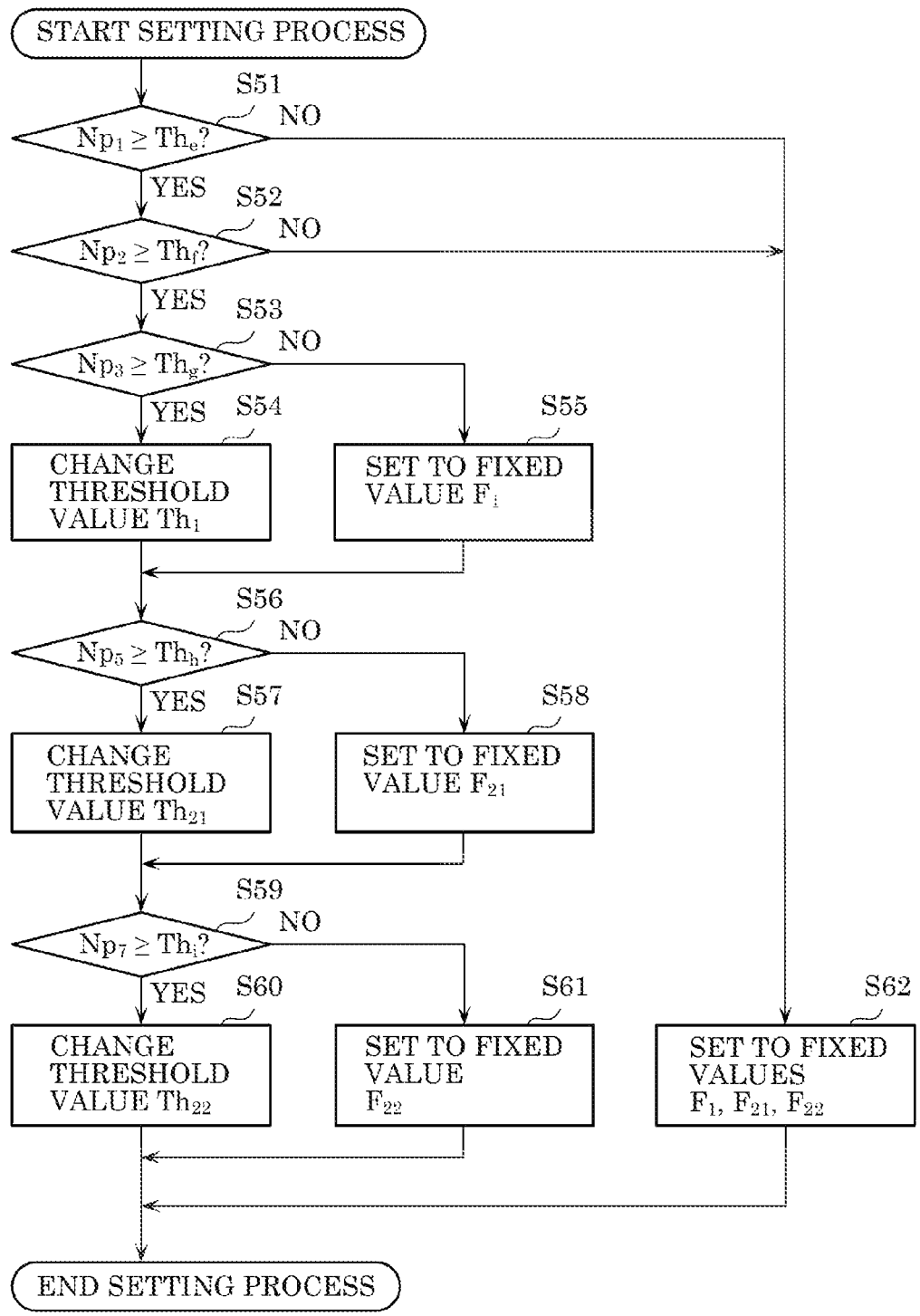
FIG. 13 is a flowchart illustrating a specific example of a setting process.

Next, setter 115 performs a setting process to set a threshold value (S6). Note that setter 115 sets each threshold value by storing the determined value into storage 116 as the threshold value. Here, a specific example of the setting process will be described with reference to FIG. 13. FIG. 13 is a flowchart illustrating a specific example of the setting process.

Setter 115 determines whether or not first pixel count $Np_1$ is greater than or equal to threshold value $Th_e$ (S51). When first pixel count $Np_1$ is greater than or equal to threshold value $Th_e$ (YES in S51), setter 115 performs Step S52, and when first pixel count $Np_1$ is less than threshold value $Th_e$ (NO in S51), setter 115 performs Step S62.

Note that threshold value $Th_e$ is one example of the third threshold value. Threshold value $Th_e$ is a value obtained by multiplying the total number of pixels in first region 201 of image 200 by a third percentage or a value predetermined according to the total number of pixels in image 200.

In Step S52, setter 115 determines whether or not second pixel count $Np_2$ is greater than or equal to threshold value $Th_f$ (S52). When second pixel count $Np_2$ is greater than or equal to threshold value $Th_f$ (YES in S52), setter 115 performs Step S53, and when second pixel count $Np_2$ is less than threshold value $Th_f$ (NO in S52), setter 115 performs Step S62.

Note that threshold value $Th_f$ is one example of the fourth threshold value. Threshold value $Th_f$ is a value obtained by multiplying the total number of pixels in second regions 202, 203 of image 200 by a fourth percentage or a value predetermined according to the total number of pixels in image 200.

In Step S53, setter 115 determines whether or not third pixel count $Np_3$ is greater than or equal to threshold value $Th_g$ (S53). When third pixel count $Np_3$ is greater than or equal to threshold value $Th_g$ (YES in S53), setter 115 performs Step S54, and when third pixel count $Np_3$ is less than threshold value $Th_g$ (NO in S53), setter 115 performs Step S55.

Note that threshold value $Th_g$ is one example of the fifth threshold value. Threshold value $Th_g$ is a value obtained by multiplying the total number of pixels in image 200 by a fifth percentage or a value predetermined according to the total number of pixels in image 200.

Here, third pixel count $Np_3$ is the number of pixels classified under a low saturation range in the differential saturation histogram calculated by calculator 114. The low saturation range is a range in which the saturation is lower than first saturation. In the present embodiment, the low saturation range is nine saturation ranges counted in ascending order of saturation among 32 saturation ranges, for example.

In Step S54, setter 115 dynamically changes threshold value $Th_1$, which is used in an exclusion process to be described later, into a value dependent on fourth pixel count $Np_4$ which is the number of pixels classified under the low saturation range in the second saturation histogram (S54). Specifically, setter 115 sets threshold value $Th_1$ so that threshold value $Th_1$ decreases as fourth pixel count $Np_4$ increases. For example, using fixed value $F_1$ to be described later as a reference, setter 115 sets threshold value $Th_1$ to be smaller than fixed value $F_1$. Note that the wording "setting threshold value $Th_1$" specifically means storing a value decreasing with an increase in fourth pixel count $Np_4$ into storage 116 as threshold value $Th_1$. Threshold value $Th_1$ is one example of the first threshold value.

In Step S55, setter 115 sets threshold value $Th_1$ to predetermined fixed value $F_1$ (S55). Specifically, setter 115 sets threshold value $Th_1$ by storing predetermined fixed value $F_1$ into storage 116 as threshold value $Th_1$. Note that fixed value $F_1$ is a value obtained by multiplying the total number of pixels in second regions 202, 203 by a first percentage or a value predetermined according to the total number of pixels in image 200.

Next, setter 115 determines whether or not fifth pixel count $Np_5$ is greater than or equal to threshold value $Th_1$ (S56). When fifth pixel count $Np_5$ is greater than or equal to threshold value $Th_1$ (YES in S56), setter 115 performs Step S57, and when fifth pixel count $Np_5$ is less than threshold value $Th_1$ (NO in S56), setter 115 performs Step S58.

Note that threshold value $Th_1$ is one example of the sixth threshold value. Threshold value $Th_1$ is a value obtained by multiplying the total number of pixels in image 200 by a sixth percentage or a value predetermined according to the total number of pixels in image 200.

Here, fifth pixel count $Np_5$ is the number of pixels classified under a first high saturation range in the differential saturation histogram calculated by calculator 114. The first high saturation range is a range of low saturation among high saturation ranges in which the saturation is higher than second saturation. The second saturation is higher than the first saturation. Note that in the present embodiment, the high saturation range is divided into two saturation ranges. Specifically, the high saturation range is segmented as (i) the first high saturation range which is a range of saturation lower in the high saturation range and (ii) a second high saturation range which is a range of saturation higher than the saturation in the first high saturation range. In the present embodiment, the high saturation range is 20 saturation ranges counted in ascending order of saturation among 32 saturation ranges.

In Step S57, setter 115 dynamically changes threshold value $Th_{21}$, which is used in the exclusion process to be described later, into a value dependent on sixth pixel count $Np_6$ which is the number of pixels classified under the first high saturation range in the second saturation histogram (S57). Specifically, setter 115 sets threshold value $Th_{21}$ so that threshold value $Th_{21}$ decreases as sixth pixel count $Np_6$ increases. For example, using fixed value $F_{21}$ to be described later as a reference, setter 115 sets threshold value $Th_{21}$ to be smaller than fixed value $F_{21}$. Note that the wording "setting threshold value $Th_{21}$" specifically means storing a value decreasing with an increase in sixth pixel count $Np_6$ into storage 116 as threshold value $Th_{21}$. Threshold value $Th_{21}$ is one example of the second threshold value.

In Step S58, setter 115 sets threshold value $Th_{21}$ to predetermined fixed value $F_{21}$ (S58). Specifically, setter 115 sets threshold value $Th_{21}$ by storing predetermined fixed value $F_{21}$ into storage 116 as threshold value $Th_{21}$. Note that fixed value $F_{21}$ is a value obtained by multiplying the total number of pixels in second regions 202, 203 by a second percentage or a value predetermined according to the total number of pixels in image 200. Fixed value $F_{21}$ is one example of the second fixed value.

Next, setter 115 determines whether or not seventh pixel count $Np_7$ is greater than or equal to threshold value $Th_1$ (S59). When seventh pixel count $Np_7$ is greater than or equal to threshold value $Th_1$ (YES in S59), setter 115 performs Step S60, and when seventh pixel count $Np_7$ is less than threshold value $Th_1$ (NO in S59), setter 115 performs Step S61. Note that seventh pixel count $Np_7$ is another example of the fifth pixel count.

Note that threshold value $Th_1$ is another example of the sixth threshold value. Threshold value $Th_1$ is a value obtained by multiplying the total number of pixels in image 200 by a seventh percentage or a value predetermined according to the total number of pixels in image 200. Note that the sixth percentage and the seventh percentage may be equal values or may be different values.

Here, seventh pixel count $Np_7$ is the number of pixels classified under the second high saturation range in the differential saturation histogram calculated by calculator 114.

In Step S60, setter 115 dynamically changes threshold value $Th_{22}$, which is used in the exclusion process to be described later, into a value dependent on eighth pixel count $Np_8$ which is the number of pixels classified under the second high saturation range in the second saturation histogram (S60). Specifically, setter 115 sets threshold value $Th_{22}$ so that threshold value $Th_{22}$ decreases as eighth pixel count $Np_8$ increases. For example, using fixed value $F_{22}$ to be described later as a reference, setter 115 sets threshold value $Th_{22}$ to be smaller than fixed value $F_{22}$. Note that the wording "setting threshold value $Th_{22}$" specifically means storing a value decreasing with an increase in eighth pixel count $Np_8$ into storage 116 as threshold value $Th_{22}$. Threshold value $Th_{22}$ is another example of the second threshold value.

In Step S61, setter 115 sets threshold value $Th_{22}$ to predetermined fixed value $F_{22}$ (S61). Specifically, setter 115 sets threshold value $Th_{22}$ by storing predetermined fixed value $F_{22}$ into storage 116 as threshold value $Th_{22}$. Note that fixed value $F_{22}$ is a value obtained by multiplying the total number of pixels in second regions 202, 203 by an eighth percentage or a value predetermined according to the total number of pixels in image 200. Fixed value $F_{22}$ is another example of the second fixed value.

In Step S62, setter 115 sets threshold value $Th_1$ to predetermined fixed value $F_1$, sets threshold value $Th_{21}$ to predetermined fixed value $F_{21}$, and sets threshold value $Th_{22}$ to predetermined fixed value $F_{22}$ (S59).

Referring back to FIG. 3 and FIG. 4, this description continues.

Figure 14:
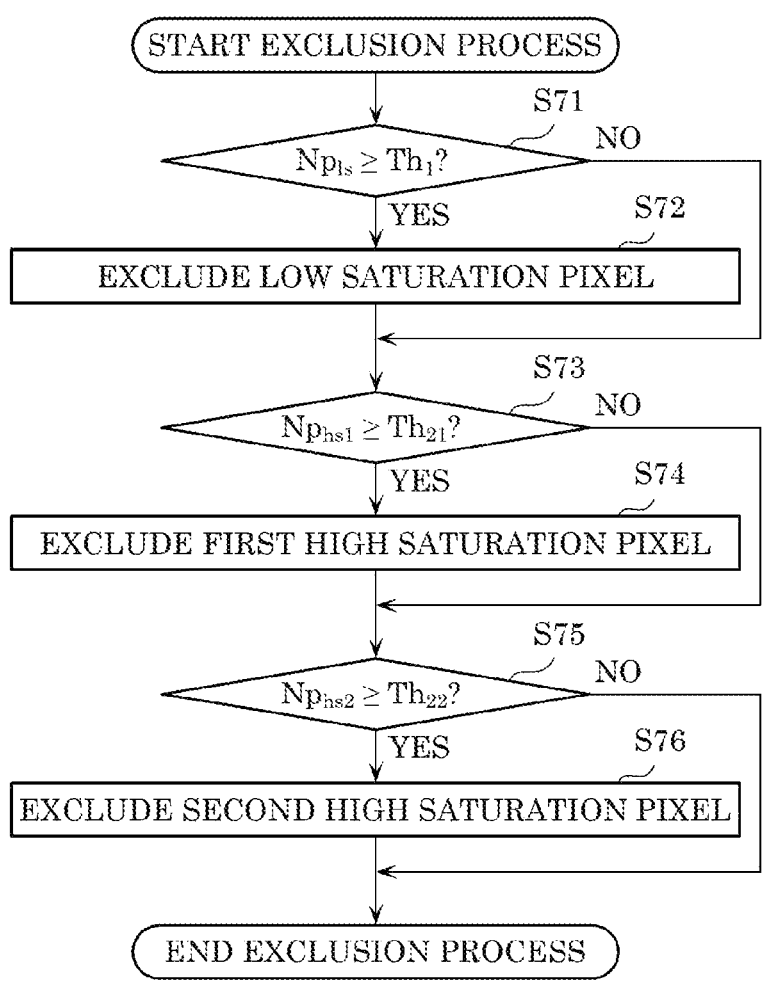
FIG. 14 is a flowchart illustrating a specific example of an exclusion process.
Figure 15:
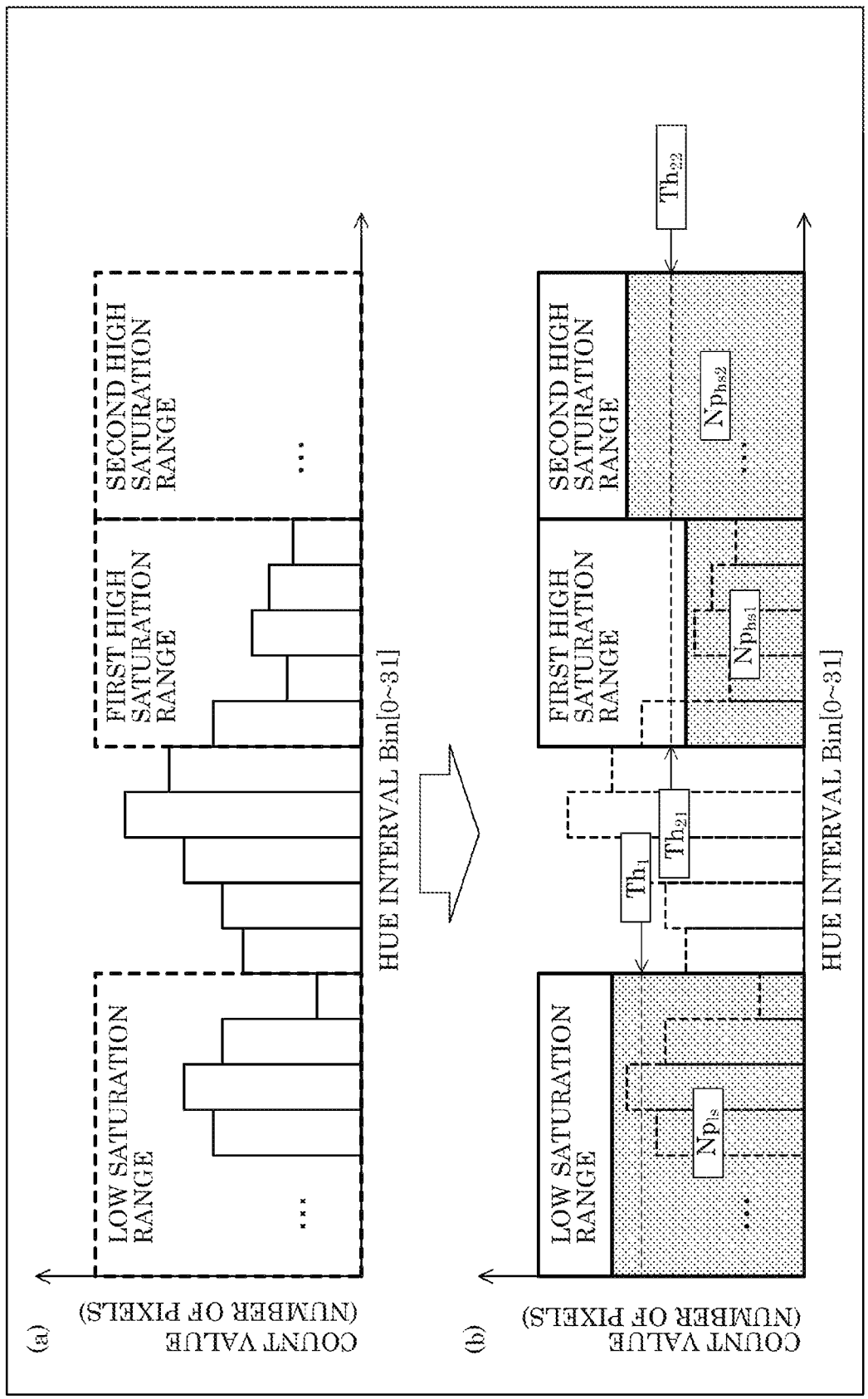
FIG. 15 is a diagram illustrating one example of a second saturation histogram for describing an exclusion process.

Excluder 117 performs the exclusion process using the first color region stored in storage 116, the first and second saturation histograms generated by generator 113, and the differential saturation histogram calculated by calculator 114 (S7). Here, a specific example of the exclusion process will be described with reference to FIG. 14 and FIG. 15. FIG. 14 is a flowchart illustrating a specific example of the exclusion process. FIG. 15 is a diagram illustrating one example of the second saturation histogram for describing the exclusion process. Note that (a) in FIG. 15 is a diagram illustrating one example of the second saturation histogram and (b) in FIG. 15 is a diagram illustrating a result of counting a value of integral of the number of pixels in each of the low saturation range, the first high saturation range, and the second high saturation range in the second saturation histogram.

Excluder 117 determines whether or not number $Np_{1s}$ of low saturation pixels each having a pixel value included in the low saturation range in second regions 202, 203 of image 200 is greater than or equal to threshold value $Th_1$ (S71). Specifically, using the second hue histogram, excluder 117 counts, as number $Np_{1s}$ of low saturation pixels, the number of pixels included in the low saturation range in the second hue histogram, and performs the determination in Step S71 using the counting result.

When excluder 117 determines that number $Np_{1s}$ of low saturation pixels is greater than or equal to threshold value $Th_1$ (YES in S71), excluder 117 performs Step S72, and when excluder 117 determines that number $Np_{1s}$ of low saturation pixels is less than threshold value $Th_1$ (NO in S71), excluder 117 does not perform Step S72, but performs Step S73.

In Step S72, excluder 117 excludes the low saturation pixel from the plurality of first current pixels of the first color region stored in storage 116 (S72), and stores a region made up of the plurality of first current pixels after the exclusion into storage 116 as a new first color region. Excluder 117 may update the first color region stored in storage 116 with the region after the exclusion in Step S72. When Step S72 is completed, the processing proceeds to Step S73.

In Step S73, excluder 117 determines whether or not number of $Np_{hs1}$ of first high saturation pixels each having a pixel value included in the first high saturation range in second regions 202, 203 of image 200 is greater than or equal to threshold value $Th_{21}$ (S73). Specifically, using the second hue histogram, excluder 117 counts, as number $Np_{hs1}$ of first high saturation pixels, the number of pixels included in the first high saturation range in the second hue histogram, and performs the determination in Step S73 using the counting result.

When excluder 117 determines that number $Np_{hs1}$ of first high saturation pixels is greater than or equal to threshold value $Th_{21}$ (YES in S73), excluder 117 performs Step S74, and when excluder 117 determines that number $Np_{hs1}$ of first high saturation pixels is less than threshold value $Th_{21}$ (NO in S73), excluder 117 does not perform Step S74, but performs Step S75.

In Step S74, excluder 117 excludes the first high saturation pixel from the plurality of first current pixels of the first color region stored in storage 116 (S74), and stores a region made up of the plurality of first current pixels after the exclusion into storage 116 as a new first color region. Excluder 117 may update the first color region stored in storage 116 with the region after the exclusion in Step S74. When Step S74 is completed, the processing proceeds to Step S75.

In Step S75, excluder 117 determines whether or not number of $Np_{hs2}$ of second high saturation pixels each having a pixel value included in the second high saturation range in second regions 202, 203 of image 200 is greater than or equal to threshold value $Th_{22}$ (S75). Specifically, using the second hue histogram, excluder 117 counts, as number $Np_{hs2}$ of second high saturation pixels, the number of pixels included in the second high saturation range in the second hue histogram, and performs the determination in Step S75 using the counting result.

When excluder 117 determines that number $Np_{hs2}$ of second high saturation pixels is greater than or equal to threshold value $Th_{22}$ (YES in S75), excluder 117 performs Step S76, and when excluder 117 determines that number N $p_{hs2}$ of second high saturation pixels is less than threshold value $Th_{22}$ (NO in S75), excluder 117 does not perform Step S76 and ends the exclusion process.

In Step S76, excluder 117 excludes the second high saturation pixel from the plurality of first current pixels of the first color region stored in storage 116 (S76), and stores a region made up of the plurality of first current pixels after the exclusion into storage 116 as a new first color region. Excluder 117 may update the first color region stored in storage 116 with the region after the exclusion in Step S76. When Step S76 is completed, the exclusion process ends.

Excluder 117 outputs, to outputter 118, the first color region obtained as a result of the exclusion process.

Referring back to FIG. 3 and FIG. 4, this description continues.

Outputter 118 outputs the plurality of second current pixels obtained as a result of the exclusion process performed by excluder 117 (S8).

Next, corrector 119 corrects image 200 by performing a predetermined image process on the plurality of second current pixels in image 200 that have been output from outputter 118 (S9). Corrector 119 performs gamma correction, for example, as the predetermined image process.

Advantageous Effects, Etc

As described above, the present embodiment includes: obtaining an image (S1); extracting, based on a pixel value of each of a plurality of pixels of image 200 obtained, a plurality of first current pixels each having a pixel value included in a first color range including a specific color range that defines a specific color, from the plurality of pixels (S2); excluding, in second regions 202, 203 different from first region 201 including a center region of image 200, (i) a low saturation pixel, which has a pixel value included in a low saturation range which is a range of saturation lower than first saturation, from the plurality of first current pixels when number $Np_{1s}$ of low saturation pixels is greater than or equal to threshold value $Th_1$, (ii) a first high saturation pixel, which has a pixel value included in a first high saturation range which is a range of saturation higher than second saturation higher than the first saturation, from the plurality of first current pixels when number $Np_{hs1}$ of first high saturation pixels is greater than or equal to threshold value $Th_{21}$, and (iii) a second high saturation pixel, which has a pixel value included in a second high saturation range which is a range of saturation higher than the saturation in the first saturation range, from the plurality of first current pixels when number $Np_{hs2}$ of second high saturation pixels is greater than or equal to threshold value $Th_{22}$ (S7); and outputting a plurality of second current pixels obtained as a result of the excluding (S8).

With this, using the concept of a point of gaze which represents image capture with a subject at the image center, the step of excluding is performed to exclude a predetermined pixel from the plurality of first current pixels each having a pixel value included in the first color range, according to the pixel value of each of the plurality of pixels in second regions 202, 203 in which the subject is not likely to appear. Specifically, when number $Np_{1s}$ of low saturation pixels in second regions 202, 203 is greater than or equal to threshold value $Th_1$, the low saturation pixels are excluded, and when number $Np_{hs1}$ of first high saturation pixels in second regions 202, 203 is greater than or equal to threshold value $Th_{21}$, the first high saturation pixels are excluded from the plurality of first current pixels, and when number $Np_{hs2}$ of second high saturation pixels in second regions 202, 203 is greater than or equal to threshold value $Th_{22}$, the second high saturation pixels are excluded from the plurality of first current pixels. In other words, even among the first current pixels, a low saturation pixel having a value greater than or equal to threshold value $Th_1$ in second regions 202, 203, a first high saturation pixel having a value greater than or equal to threshold value $Th_{21}$ in second regions 202, 203, and a second high saturation pixel having a value greater than or equal to threshold value $Th_{22}$ in second regions 202, 203 are estimated as pixels included in the background region different from the region of the subject and are excluded from the plurality of first current pixels. Therefore, it is possible to reduce the occurrences of the background being detected as the subject. Accordingly, a target region that is the region of the subject in the image can be effectively identified.

Furthermore, the present embodiment further includes: generating a histogram of saturation of first region 201 and a histogram of saturation of second regions 202, 203 as a first saturation histogram and a second saturation histogram, respectively (S3); calculating a differential saturation histogram by subtracting the second saturation histogram from the first saturation histogram in each bin of corresponding saturation (S4); obtaining first pixel count $Np_1$, which is a result of counting a total number of pixels having pixel values included in the specific color range in first region 201, and second pixel count $Np_2$, which is a result of counting a total number of pixels having pixel values included in the specific color range in second regions 202, 203 (S5); and setting, when first pixel count $Np_1$ is greater than or equal to threshold value $Th_e$ and second pixel count $Np_2$ is greater than or equal to threshold value $Th_f$, (i) when third pixel count $Np_3$, which is the number of pixels classified under a low saturation range in the differential saturation histogram calculated, is greater than or equal to threshold value $Th_g$, threshold value $Th_1$ to decease with an increase in fourth pixel count $Np_4$, which is the number of pixels classified under the low saturation range in the second saturation histogram, (ii) when fifth pixel count $Np_5$, which is the number of pixels classified under a first high saturation range in the differential saturation histogram, is greater than or equal to threshold value $Th_h$, threshold value $Th_{21}$ to decease with an increase in sixth pixel count $Np_6$, which is the number of pixels classified under the first high saturation range in the second saturation histogram, and (iii) when seventh pixel count $Np_7$, which is the number of pixels classified under a second high saturation range in the differential saturation histogram, is greater than or equal to threshold value $Th_1$, threshold value $Th_{22}$ to decease with an increase in eighth pixel count $Np_8$, which is the number of pixels classified under the second high saturation range in the second saturation histogram (SG). The step of excluding (S7) is performed using threshold values $Th_1$, $Th_{21}$, $Th_{22}$.

With this, when the number of pixels each having a pixel value included in the specific color range is between threshold value $Th_e$ and threshold value $Th_f$ inclusive, in each of first region 201 and second regions 202, 203, this image can be estimated as including a large image of a subject. In the case of the image including the large image of the subject, when third pixel count $Np_3$, which is the number of pixels classified under the low saturation range in the differential saturation histogram, is greater than or equal to threshold value $Th_g$, it is determined that there is a high probability that an object of a different type from the subject appears with low saturation pixels in the background, and thus threshold value $Th_1$ is set small so that the low saturation pixels are more likely to be excluded. Similarly, in the case of the image including the large image of the subject, when fifth pixel count $Np_5$, which is the number of pixels classified under the first high saturation range in the differential saturation histogram, is greater than or equal to threshold value $Th_h$, it is determined that there is a high probability that an object of a different type from the subject appears with first high saturation pixels in the background, and thus threshold value $Th_{21}$ is set small so that the first high saturation pixels are more likely to be excluded. Similarly, in the case of the image including the large image of the subject, when seventh pixel count $Np_7$, which is the number of pixels classified under the second high saturation range in the differential saturation histogram, is greater than or equal to threshold value $Th_1$, it is determined that there is a high probability that an object of a different type from the subject appears with second high saturation pixels in the background, and thus threshold value $Th_{22}$ is set small so that the second high saturation pixels are more likely to be excluded. Thus, when it is determined that there is a high probability that an image of an object of a different type from the subject is included, the threshold values are set so that the low saturation pixels, the first high saturation pixels, and/or the second high saturation pixels that probably correspond to said object are more likely to be excluded; therefore, it is possible to reduce the occurrences of the object included in the background being detected as the subject.

Furthermore, in the present embodiment, the setting includes: setting threshold value $Th_1$ to predetermined fixed value $F_1$ when third pixel count $Np_3$ is less than threshold value $Th_g$; setting threshold value $Th_{21}$ to predetermined fixed value $F_{21}$ when fifth pixel count $Np_5$ is less than threshold value $Th_{21}$; and setting threshold value $Th_{22}$ to predetermined fixed value $F_{22}$ when seventh pixel count $Np_7$ is less than threshold value $Th_{22}$.

With this, when third pixel count $Np_3$ is less than threshold value $Th_g$, it is determined that there is a low probability that an object of a different type from the subject appears with low saturation pixels in the background, and thus threshold value $Th_1$ is set to fixed value $F_1$ so that the low saturation pixels are less likely to be excluded. Similarly, when the fifth pixel count $Np_5$ is less than threshold value $Th_h$, it is determined that there is a low probability that an object of a different type from the subject appears with first high saturation pixels in the background, and thus threshold value $Th_{21}$ is set to fixed value $F_{21}$ so that the first high saturation pixels are less likely to be excluded. Similarly, when the seventh pixel count $Np_7$ is less than threshold value $Th_1$, it is determined that there is a low probability that an object of a different type from the subject appears with second high saturation pixels in the background, and thus threshold value $Th_{22}$ is set to fixed value $F_{22}$ so that the second high saturation pixels are less likely to be excluded. Thus, when it is determined that there is a low probability that an image of an object of a different type from the subject is included, the threshold values are set to the fixed values so that probable low saturation pixels and/or high saturation pixels for said object are less likely to be excluded; therefore, it is possible to reduce the occurrences of a portion of the subject being excluded as the background.

Furthermore, in the present embodiment, the extracting includes performing a first extraction process (S17), and the first extraction process includes: obtaining a first hue histogram, which is a result of generating a hue histogram of first region 201, and a second hue histogram, which is a result of generating a hue histogram of second regions 202, 203; calculating a differential hue histogram by subtracting the second hue histogram from the first hue histogram in each bin of corresponding hue (S21); determining, as a current hue histogram, the differential hue histogram calculated; performing a color range determination process for determining the first color range using the current hue histogram determined (S22); and extracting, as the plurality of first current pixels, a plurality of pixels each having a pixel value included in the first color range determined (S25). Furthermore, the color range determination process includes: selecting a predetermined number of bins in descending order of frequency from among a plurality of bins remaining after excluding one or more specific bins determined as having the specific color from a plurality of bins included in the current hue histogram (S23); and determining, as the first color range, a hue range specified by the predetermined number of bins selected and the one or more specific bins (S24).

Thus, it is possible to determine, as the first color range, a color range including not only specific colors unique to the subject, but also colors that frequently appear in the subject.

Furthermore, in the present embodiment, the extracting further includes: counting a total number of pixels determined as having the specific color in first region 201, and outputting, as first pixel count Np 1, the total number of pixels counted; counting a total number of pixels determined as having the specific color in second regions 202, 203, and outputting, as second pixel count $Np_2$, the total number of pixels counted (S12); and performing the first extraction process when first pixel count $Np_1$ is less than threshold value $Th_a$ and second pixel count $Np_2$ is greater than or equal to threshold value $Th_b$, and performing a second extraction process when first pixel count $Np_1$ is greater than or equal to threshold value $Th_a$ and second pixel count $Np_2$ is less than threshold value $Th_b$ (S15). The second extraction process includes: obtaining the first hue histogram; performing the color range determination process on the first hue histogram obtained (S31); and extracting the plurality of first current pixels having the pixel values included in the first color range determined (S34).

Thus, when the number of pixels in first region 201 that are determined as having the specific color is large, specifically, greater than or equal to threshold value $Th_a$, and the number of pixels in second regions 202, 203 that are determined as having the specific color is small, specifically, less than threshold value Thb, first region 201 includes many pixels of the specific color, and therefore it can be estimated that first region 201 includes an image of a larger portion of the subject than second regions 202, 203 do. Accordingly, by performing the color range determination process on the first hue histogram of first region 201, it is possible to determine, as the first color range, a color range including a color that frequently appears in the subject.

Furthermore, in the present embodiment, the extracting includes performing a third extraction process when first pixel count $Np_1$ is less than threshold value $Th_e$ less than threshold value $Th_a$ and second pixel count $Np_2$ is less than threshold value $Th_d$ less than threshold value $Th_b$ (S19). The third extraction process includes: determining the specific color range as the first color range (S41); and extracting the plurality of first current pixels having the pixel values included in the first color range determined (S42).

When the number of pixels in first region 201 that are determined as having the specific color is small, specifically, less than threshold value $Th_e$, and the number of pixels in second regions 202, 203 that are determined as having the specific color is small, specifically, less than threshold value $Th_d$, the specific color less frequently appears in both first region 201 and second regions 202, 203, and therefore it can be estimated that an image of a small portion of the subject is included in the whole image. Thus, it is possible to effectively detect the subject by determining the specific color range as the first color range.

[Variations]

(1) In the above embodiment, the high saturation range is divided as the first high saturation range and the second high saturation range, and in the setting process, threshold values $Th_{21}$, $Th_{22}$ are set in these respective ranges, but this is not limiting; one threshold value may be set in one high saturation range. Specifically, in the case where one threshold value is set in one high saturation range, Steps S59 to S61 in the setting process in FIG. 13 are not performed, Steps S75 and S76 in the exclusion process in FIG. 14 are not performed, and the first high saturation range is replaced by a high saturation range.

Figure 16:
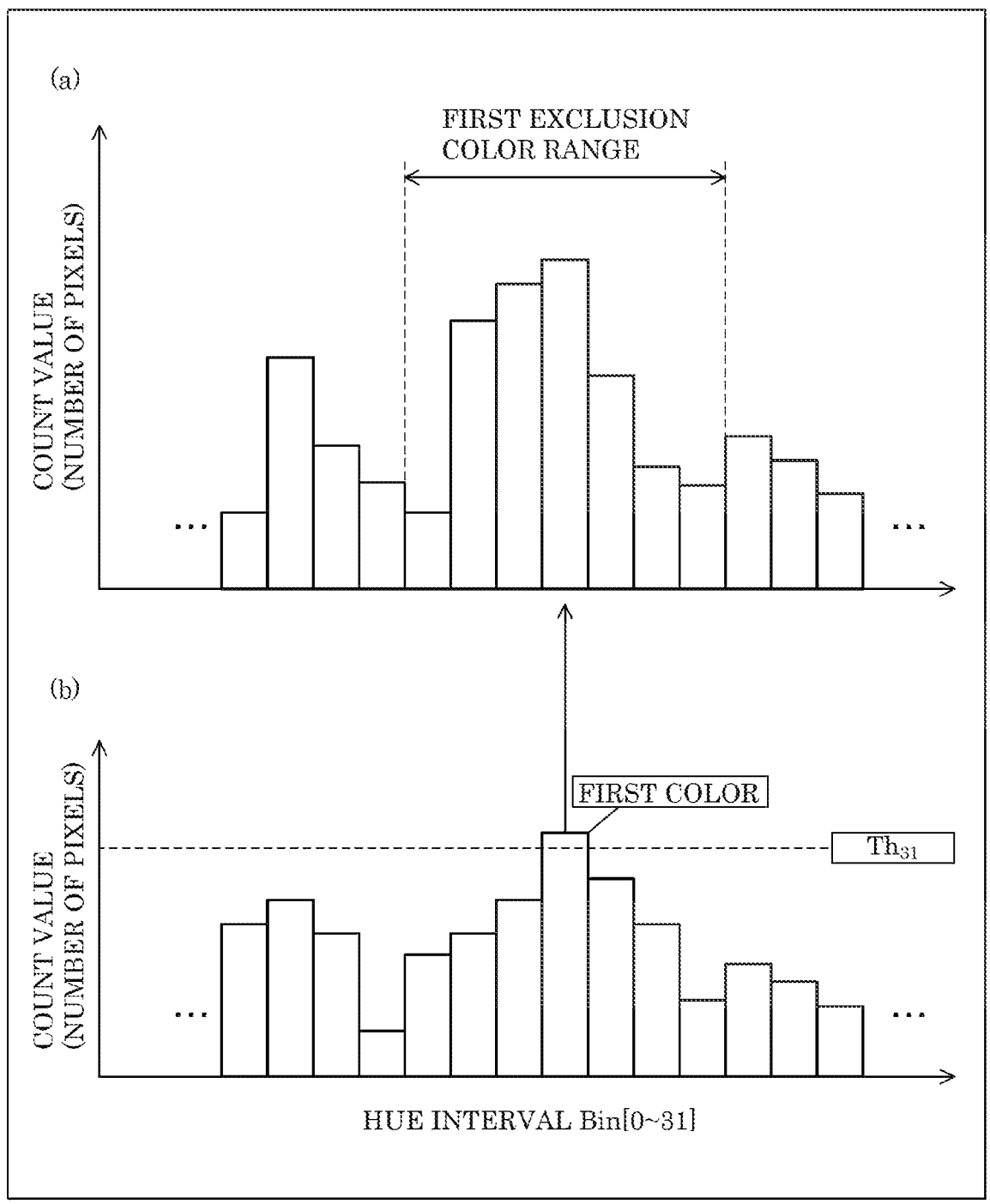
FIG. 16 is a diagram illustrating one example of a hue histogram for describing an exclusion color detection process.

(2) In the above embodiment, the step of extracting may include an exclusion color detection process of determining a color to be excluded, in order to exclude a color that has been frequently detected in second regions 202, 203. The exclusion color detection process will be specifically described with reference to FIG. 16. FIG. 16 is a diagram illustrating one example of a hue histogram for describing the exclusion color detection process. In FIG. 16, (a) is a diagram illustrating one example of the differential hue histogram, and (b) is a diagram illustrating one example of the second hue histogram.

In the exclusion color detection process, in the second hue histogram illustrated in (b) in FIG. 16, a predetermined range based on a bin with the number of pixels greater than or equal to threshold value $Th_{31}$ (first exclusion color range) may be determined as a second color range which is the range of a color to be excluded, and the first color range may be determined from the color range excluding the second color range. In this case, when the second hue histogram includes no bin with the number of pixels greater than or equal to threshold value $Th_{31}$, the second color range which is the range of a color to be excluded is not determined, and the process of excluding the second color range from the first color range is not performed.

Note that in the second hue histogram, when the number of pixels each having a pixel value included in the second color range different from the specific color range is greater than the number of pixels each having a pixel value included in the specific color range, the first color range may be determined from the color range excluding the second color range.

When the second hue histogram includes a bin with the number of pixels greater than or equal to threshold value $Th_{31}$, the second color range based on said bin is a color that frequently appears in the background region and therefore can be estimated as being the background color. Thus, by determining the first color range from the color range excluding the second color range, it is possible to reduce the occurrence of the background color being selected as the first color range.

(3) In the above embodiment, image processing device 110 is a device built-in in display apparatus 100, but this is not limiting; image processing device 110 may be a device built-in in an imaging apparatus. An image processing device in this case, for example, obtains image data from an image sensor included in the imaging apparatus, performs the image processing method described in the above embodiment, and outputs a plurality of second current pixels. The imaging apparatus may identify a subject by using the plurality of output second current pixels, and may use the region of the identified subject in the process of adjusting focus or the process of adjusting exposure.

(4) In the above embodiment, display apparatus 100 includes tuner 101, and obtainer 111 is implemented using tuner 101, but this is not limiting. Obtainer 111 may obtain image data by reading image data recorded in a recording medium such as an optical disc, a secure digital (SD) card, a hard disk drive (HDD), and a solid-state drive (SSD). In this case, obtainer 111 may be implemented using an electrical device such as an optical pickup system that reads an optical disc. Alternatively, obtainer 111 may obtain image data from an external server via a network such as the Internet. In this case, obtainer 111 may be implemented using a communication interface for performing communication with an external server. Alternatively, obtainer 111 may obtain image data from an external device connected via an external interface such as a high-definition multimedia interface (HDMI) (registered trademark) terminal, a universal serial bus (USB) terminal, and a RCA terminal.

Note that in the above embodiment, each of the structural elements may be configured in the form of an exclusive hardware product or may be implemented by executing a software program suitable for the structural element. Each of the structural elements may be implemented by a program executing unit such as a central processing unit (CPU) or a processor reading and executing the software program recorded on a recording medium such as a hard disk or a semiconductor memory. Here, software for implementing the image decoding device, etc., according to the above embodiment is a program described below.

Specifically, this program causes a computer to execute an image processing method including: obtaining an image; extracting a plurality of first current pixels from a plurality of pixels of the image obtained, based on a pixel value of each of the plurality of pixels, the plurality of first current pixels each having a pixel value included in a first color range including a specific color range that defines a specific color; excluding, in a second region different from a first region including a center region of the image, (i) a low saturation pixel from the plurality of first current pixels when a total number of low saturation pixels is greater than or equal to a first threshold value, and (ii) a high saturation pixel from the plurality of first current pixels when a total number of high saturation pixels is greater than or equal to a second threshold value, the low saturation pixel having a pixel value included in a low saturation range which is a range of saturation lower than first saturation, the high saturation pixel having a pixel value included in a high saturation range which is a range of saturation higher than second saturation higher than the first saturation; and outputting a plurality of second current pixels obtained as a result of the excluding.

As described above, the embodiment is presented as exemplifications of the technique according to the present disclosure. The accompanying drawings and detailed description are provided for this purpose.

Therefore, the structural elements described in the accompanying drawings and detailed description include not only structural elements essential to solving the problem, but also structural elements that are not essential to solving the problem but are included in order to exemplify the aforementioned technique. As such, description of these non-essential structural elements in the accompanying drawings and the detailed description should not be taken to mean that these non-essential structural elements are essential.

Furthermore, since the foregoing embodiment is for exemplifying the technique according to the present disclosure, various changes, substitutions, additions, omissions, and so on, can be carried out within the scope of the Claims or its equivalents.

INDUSTRIAL APPLICABILITY

The present disclosure is applicable to an image processing method, etc., in which a target region that is the region of a subject in an image can be effectively identified. Specifically, the present disclosure is applicable to, for example, a display apparatus such as a television and an imaging apparatus such as a camera.

The invention claimed is:

1. An image processing method, comprising:
obtaining an image;
extracting a plurality of first current pixels from a plurality of pixels of the image obtained, based on a pixel value of each of the plurality of pixels, the plurality of first current pixels each having a pixel value included in a first color range including a specific color range that defines a specific color;
excluding, in a second region different from a first region including a center region of the image, (i) a low saturation pixel from the plurality of first current pixels when a total number of low saturation pixels is greater than or equal to a first threshold value, and (ii) a high saturation pixel from the plurality of first current pixels when a total number of high saturation pixels is greater than or equal to a second threshold value, the low saturation pixel having a pixel value included in a low saturation range which is a range of saturation lower than first saturation, the high saturation pixel having a pixel value included in a high saturation range which is a range of saturation higher than second saturation higher than the first saturation; and
outputting a plurality of second current pixels obtained as a result of the excluding.

2. The image processing method according to claim 1, further comprising:
generating a histogram of saturation of the first region and a histogram of saturation of the second region as a first saturation histogram and a second saturation histogram, respectively;
calculating a differential saturation histogram by subtracting the second saturation histogram from the first saturation histogram in each bin of corresponding saturation;
obtaining a first pixel count and a second pixel count, the first pixel count being a result of counting a total number of pixels having pixel values included in the specific color range in the first region, the second pixel count being a result of counting a total number of pixels having pixel values included in the specific color range in the second region; and
setting, when the first pixel count is greater than or equal to a third threshold value and the second pixel count is greater than or equal to a fourth threshold value, (i) when a third pixel count is greater than or equal to a fifth threshold value, the first threshold value to decease with an increase in a fourth pixel count, and (ii) when a fifth pixel count is greater than or equal to a sixth threshold value, the second threshold value to decease with an increase in a sixth pixel count, the third pixel count being a total number of pixels classified under the low saturation range in the differential saturation histogram calculated, the fourth pixel count being a total number of pixels classified under the low saturation range in the second saturation histogram, the fifth pixel count being a total number of pixels classified under the high saturation range in the differential saturation histogram, the sixth pixel count being a total number of pixels classified under the high saturation range in the second saturation histogram, wherein
the excluding is performed using the first threshold value and the second threshold value that have been set.

3. The image processing method according to claim 2, wherein
the setting includes: setting the first threshold value to a first fixed value when the third pixel count is less than the fifth threshold value; and setting the second threshold value to a second fixed value when the fifth pixel count is less than the sixth threshold value, each of the first fixed value and the second fixed value being predetermined.

4. The image processing method according to claim 2, wherein
the extracting includes performing a first extraction process,
the first extraction process includes:
obtaining a first hue histogram and a second hue histogram, the first hue histogram being a result of generating a hue histogram of the first region, the second hue histogram being a result of generating a hue histogram of the second region;
calculating a differential hue histogram by subtracting the second hue histogram from the first hue histogram in each bin of corresponding hue;
determining, as a current hue histogram, the differential hue histogram calculated;
performing a color range determination process for determining the first color range using the current hue histogram determined; and
extracting, as the plurality of first current pixels, a plurality of pixels each having a pixel value included in the first color range determined, and
the color range determination process includes:
selecting a predetermined number of bins in descending order of frequency from among a plurality of bins remaining after excluding one or more specific bins determined as having the specific color from a plurality of bins included in the current hue histogram; and
determining, as the first color range, a hue range specified by the predetermined number of bins selected and the one or more specific bins.

5. The image processing method according to claim 4, wherein
the extracting further includes:
counting a total number of pixels determined as having the specific color in the first region, and outputting, as the first pixel count, the total number of pixels counted;
counting a total number of pixels determined as having the specific color in the second region, and outputting, as the second pixel count, the total number of pixels counted; and
performing the first extraction process when the first pixel count is less than a seventh threshold value and the second pixel count is greater than or equal to an eighth threshold value, and performing a second extraction process when the first pixel count is greater than or equal to the seventh threshold value and the second pixel count is less than the eighth threshold value, and the second extraction process includes:
  obtaining the first hue histogram; and
  performing the color range determination process on the first hue histogram obtained, and extracting the plurality of first current pixels having the pixel values included in the first color range determined.

6. The image processing method according to claim 5, wherein
the extracting includes:
performing a third extraction process when the first pixel count is less than a ninth threshold value less than the seventh threshold value and the second pixel count is less than a tenth threshold value less than the eighth threshold value, and
the third extraction process includes:
determining the specific color range as the first color range; and extracting the plurality of first current pixels having the pixel values included in the first color range determined.

7. The image processing method according to claim 4, wherein
the extracting further includes: generating the hue histogram of each of the first region and the second region; and outputting the hue histogram of the first region and the hue histogram of the second region as the first hue histogram and the second hue histogram, respectively.

8. The image processing method according to claim 1, wherein
the specific color is a human skin color.

9. An image processing device, comprising:
an obtainer that obtains an image;
an extractor that extracts, based on a pixel value of each of a plurality of pixels of the image, a plurality of first current pixels each having a pixel value included in a first color range including a specific color range that defines a specific color;
an excluder that excludes, in a second region different from a first region including a center region of the image, (i) a low saturation pixel from the plurality of first current pixels when a total number of low saturation pixels is greater than or equal to a first threshold value, and (ii) a high saturation pixel from the plurality of first current pixels when a total number of high saturation pixels is greater than or equal to a second threshold value, the low saturation pixel having a pixel value included in a low saturation range which is a range of saturation lower than first saturation, the high saturation pixel having a pixel value included in a high saturation range which is a range of saturation higher than second saturation higher than the first saturation; and
an outputter that outputs a plurality of second current pixels obtained as a result of the exclusion by the excluder.

10. A non-transitory computer-readable recording medium having stored thereon a program for causing a computer to perform an image processing method including:
obtaining an image;
extracting, based on a pixel value of each of a plurality of pixels of the image, a plurality of first current pixels each having a pixel value included in a first color range including a specific color range that defines a specific color;
excluding, in a second region different from a first region including a center region of the image, (i) a low saturation pixel from the plurality of first current pixels when a total number of low saturation pixels is greater than or equal to a first threshold value, and (ii) a high saturation pixel from the plurality of first current pixels when a total number of high saturation pixels is greater than or equal to a second threshold value, the low saturation pixel having a pixel value included in a low saturation range which is a range of saturation lower than first saturation, the high saturation pixel having a pixel value included in a high saturation range which is a range of saturation higher than second saturation higher than the first saturation; and
outputting a plurality of second current pixels obtained as a result of the excluding.

* * * * *